US009768710B2

(12) United States Patent
Oates et al.

(10) Patent No.: US 9,768,710 B2
(45) Date of Patent: Sep. 19, 2017

(54) CONVERTER

(71) Applicant: ALSTOM Technology Ltd, Baden (CH)

(72) Inventors: Colin Oates, Stafford (GB); Kevin J. Dyke, Staffordshire (GB); David Reginald Trainer, Derby (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 123 days.

(21) Appl. No.: 14/760,183

(22) PCT Filed: Dec. 6, 2013

(86) PCT No.: PCT/EP2013/075845
§ 371 (c)(1),
(2) Date: Jul. 9, 2015

(87) PCT Pub. No.: WO2014/108258
PCT Pub. Date: Jul. 17, 2014

(65) Prior Publication Data
US 2015/0357931 A1 Dec. 10, 2015

(30) Foreign Application Priority Data

Jan. 11, 2013 (EP) .................................... 13275005

(51) Int. Cl.
*H02M 7/483* (2007.01)
*H02M 7/219* (2006.01)
(Continued)

(52) U.S. Cl.
CPC ........... *H02M 7/217* (2013.01); *H02M 7/483* (2013.01); *H02M 7/493* (2013.01); *H02M 7/219* (2013.01); *H02M 2007/4835* (2013.01)

(58) Field of Classification Search
CPC ............ H02M 7/04; H02M 7/12; H02M 7/14; H02M 7/143; H02M 7/146; H02M 7/15;
(Continued)

(56) References Cited

U.S. PATENT DOCUMENTS

| 5,923,546 A | 7/1999 | Shimada et al. |
| 2012/0069610 A1 | 3/2012 | Trainer et al. |

(Continued)

FOREIGN PATENT DOCUMENTS

| CH | WO 2014082657 A1 * | 6/2014 | ............ H02M 7/487 |
| CN | 102195508 A | 9/2011 | |

(Continued)

OTHER PUBLICATIONS

Buja, G.S. et al., "Optimal Pulsewidth Modulation for Feeding AC Motors," IEEE Transactions on Industry Applications, vol. IA-13, Issue 1, pp. 38-44 (1977).

(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A voltage source converter (30) comprises a converter limb (36), having primary and secondary limbs connected in parallel between first and second DC terminals (32,34), the primary limb element including first and second primary limb element portions (38,40) separated by a third terminal (42), being connectable to an AC electrical network (46), each primary limb element portion (38,40) including at least one primary switching element (50), the secondary limb including first and second secondary limb element portions (52,54) separated by a junction (56), and including a DC side chain-link converter (58), and a connection interconnecting the third terminal (42) and the junction (56) wherein the
(Continued)

voltage source converter (30) further includes a control unit (62) controlling the switching of the respective switching elements.

30 Claims, 19 Drawing Sheets

(51) Int. Cl.
*H02M 7/493* (2007.01)
*H02M 7/217* (2006.01)

(58) Field of Classification Search
CPC ........ H02M 7/217; H02M 7/219; H02M 7/42;
H02M 7/44; H02M 7/48; H02M 7/483;
H02M 7/49; H02M 7/493; H02M 7/537;
H02M 7/5387; H02M 7/5388; H02M
7/539; H02M 7/5395; H02M 7/757;
H02M 7/7575; H02M 7/797; H02M
2007/4835; H02M 1/32; H02M
2001/0058; H02M 2001/322; H02M
2001/325; Y02B 70/1491
See application file for complete search history.

(56) References Cited

U.S. PATENT DOCUMENTS

| | | | |
|---|---|---|---|
| 2012/0120691 A1 | 5/2012 | Armschat et al. | |
| 2012/0127766 A1 | 5/2012 | Crookes et al. | |
| 2012/0195084 A1 | 8/2012 | Norrga | |
| 2013/0128629 A1 | 5/2013 | Clare et al. | |
| 2013/0208514 A1 | 8/2013 | Trainer et al. | |
| 2014/0293668 A1 | 10/2014 | Trainer | |
| 2014/0362479 A1* | 12/2014 | Park | H02M 1/32 361/18 |
| 2015/0295507 A1* | 10/2015 | Barupati | H02M 7/487 363/35 |
| 2015/0349520 A1 | 12/2015 | Davidson et al. | |
| 2015/0357931 A1 | 12/2015 | Oates et al. | |
| 2015/0357941 A1 | 12/2015 | Oates et al. | |
| 2016/0105109 A1 | 4/2016 | Jasim et al. | |
| 2016/0141876 A1 | 5/2016 | Oates et al. | |
| 2016/0248341 A1 | 8/2016 | Trainer et al. | |

FOREIGN PATENT DOCUMENTS

| | | | |
|---|---|---|---|
| CN | 102332809 A | 1/2012 | |
| EP | 2 755 315 A1 | 7/2014 | |
| EP | 2 755 317 A1 | 7/2014 | |
| EP | 2 773 006 A1 | 9/2014 | |
| EP | 2 797 216 A1 | 10/2014 | |
| GB | 1 483 201 A | 8/1977 | |
| GB | 2 516 068 A | 1/2015 | |
| JP | 2001-238484 A | 8/2001 | |
| JP | 2007-259688 A | 10/2007 | |
| JP | 2009-022094 A | 1/2009 | |
| SE | WO 2012163841 A1 * | 12/2012 | ................ H02J 3/36 |
| WO | WO-2010/088969 A1 | 8/2010 | |
| WO | WO-2011/015227 A1 | 2/2011 | |
| WO | WO-2011/050847 A1 | 5/2011 | |
| WO | WO-2011/098117 A1 | 8/2011 | |
| WO | WO-2011/127980 A1 | 10/2011 | |
| WO | WO 2011124258 A1 | 10/2011 | |
| WO | WO-2012/003857 A1 | 1/2012 | |
| WO | WO-2012/013248 A1 | 2/2012 | |
| WO | WO-2012/025142 A1 | 3/2012 | |
| WO | WO-2012/163841 A1 | 12/2012 | |
| WO | WO-2013/000510 A1 | 1/2013 | |
| WO | WO-2014/108225 A1 | 7/2014 | |
| WO | WO-2014/108257 A1 | 7/2014 | |
| WO | WO-2014/108258 A1 | 7/2014 | |
| WO | WO-2014/131476 A1 | 9/2014 | |
| WO | WO-2014/173606 A1 | 10/2014 | |

OTHER PUBLICATIONS

Oates, C., "Optimal PWM on a Microcomputer," IEE International Conference on Variable Speed Drives, London, England (1984).
Patel, H.S. et al., "Generalised Techniques of Harmonic Elimination and Voltage Control in Thyristor Inverters: Part 1 013 Harmonic Elimination," IEEE Transactions on Industry Applications, vol. IA-9, Issue 3, pp. 310-317 (1973).
Patel, H.S. et al., "Generalised Techniques of Harmonic Elimination and Voltage Control in Thyristor Inverters: Part 2 013 Voltage Control Techniques," IEEE Transactions on Industry Applications, vol. IA-10, Issue 5, pp. 666-673 (1974).
Trainer, D.R. et al., "B4-111 A new Hybrid Voltage-Sourced Converter for HVDC Power Transmission," Cigre Session 2010, Cigre, Paris, France, pp. 1-12, XP008134692 (Aug. 23, 2010).
International Search Report and Written Opinion for Application No. PCT/EP2003/075845, mailed Feb. 11, 2015, 13 pages.
Feldman et al., A Hybrid Voltage Source Converter Arrangement for HVDC Power Transmission and Reactive Power Compensation, 5th IET International Conference on Power Electronics, Machines and Drives (PEMD 2010), Apr. 19, 2010, 6 pages.
Feldman et al., A Hybrid Modular Multilevel Voltage Source Converter for HVDC Power Transmission, IEEE Transaction on Industry Application, vol. 49, No. 4, Jul. 1, 2013, 12 pages.
Davidson, C.C. et al., "Innovative Concepts for Hybrid Multi-Level Converters for HVDC Power Transmission", International Conference on AC and DC Power Transmission, pp. 1-5 (Oct. 19, 2010).
Depenbrock, M., "Pulse width control of a 3-phase inverter with non-sinusoidal phase voltages," International Semiconductor Power Converter Conference, pp. 399-403 (1977).
Hava, A., et al., "High Performance Generalized Discontinuous PWM Algorithm," IEEE Transactions on Industry Applications, vol. 34, No. 5, pp. 1059-1071 (Sep./Oct. 1998).
Lesnicar, A., et al., "An Innovative Modular Multilevel Converter Topology Suitable for a Wide Power Range," Proceeding of IEEE Power Technology Conference, 6 pages (2003).
Sebasthi, Rani K. et al., "Multilevel Shunt Active Filter based on Sinusoidal Subtraction Methods Under Different Load Conditions," Computational Technologies in Electrical and Electronics Engineering (Suburcon), pp. 629-697, ISBN: 978-1-4244-7625-1 (2010).
International Search Report and Written Opinion, PCT/EP2014/075842, Alstom Technology Ltd, 13 pages (Jan. 20, 2015).
International Search Report and Written Opinion, PCT/EP2014/078339, Alstom Technology Ltd, 12 pages (Mar. 20, 2015).
Picas, R., et al., "Improving capacitor voltage ripples and power losses of modular multilevel converters through discontinuous modulation," 39th Annual Conference on the IEEE Industrial Electronics Society, pp. 6233-6238 (Nov. 10, 2013).
Kolar, J.W., et al., "Influence of the modulation method on the conduction and switching losses of a PWM converter system," Conference Record of the Industry Applications Society Annual Meeting, 25, pp. 502-512 (Oct. 7-12, 1990).
U.S. Non-Final Office Action issued in connection with Related U.S. Appl. No. 14/760,450 dated Jul. 14, 2017.

\* cited by examiner

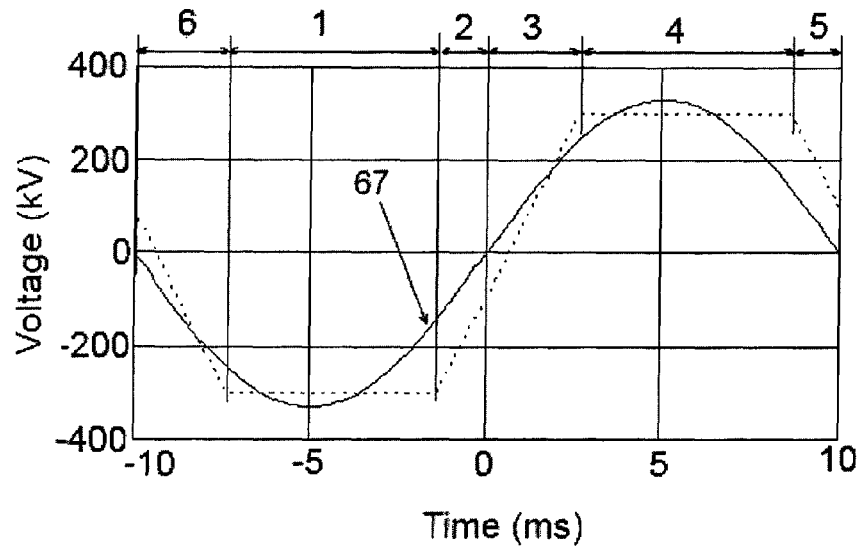

Figure 16

| Section | Primary limb element portion 38 | Primary limb element portion 40 | Secondary limb element portion 52 | Secondary limb element portion 54 |
|---|---|---|---|---|
| 1 | Open | Closed | Current source | Current source, $I_{ref} = 0$ |
| 2 | Open | Open | Current source, $I_{ref} = 0$ | Voltage source |
| 3 | Open | Open | Voltage source | Current source, $I_{ref} = 0$ |
| 4 | Closed | Open | Current source, $I_{ref} = 0$ | Current source |
| 5 | Open | Open | Voltage source | Current source, $I_{ref} = 0$ |
| 6 | Open | Open | Current source, $I_{ref} = 0$ | Voltage source |

Figure 17

CONVERTER

CROSS REFERENCE TO RELATED APPLICATIONS

The present application is a National Stage of International Application No. PCT/EP2013/075845, filed Dec. 6, 2013, which claims priority to European Application No. 13275005.0, filed Jan. 11, 2013, which is incorporated herein by reference in its entirety.

This invention relates to a voltage source converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies.

In any such power transmission network, converters are required at each interface between AC and DC power to effect the required conversion, and one such form of converter is a voltage source converter (VSC).

It is known in voltage source converters to use six-switch (two-level) and three-level converter topologies 10,12 with insulated gate bipolar transistors (IGBT) 14, as shown in FIGS. 1a and 1b. The IGBT devices 14 are connected and switched together in series to enable high power ratings of 10's to 100's of MW to be realized. In addition, the IGBT devices 14 switch on and off several times at high voltage over each cycle of the AC supply frequency to control the harmonic currents being fed to the AC electrical network. This leads to high losses, high levels of electromagnetic interference and a complex design.

It is also known in voltage source converters to use a multi-level converter arrangement such as that shown in FIG. 1c. The multi-level converter arrangement includes respective converter bridges 16 of cells 18 connected in series. Each converter cell 18 includes a pair of series-connected insulated gate bipolar transistors (IGBTs) 20 connected in parallel with a capacitor 22. The individual converter cells 18 are not switched simultaneously and the converter voltage steps are comparatively small. The capacitor 22 of each converter cell 18 is configured to have a sufficiently high capacitive value in order to constrain the voltage variation at the capacitor terminals in such a multi-level converter arrangement, and a high number of converter cells 18 are required due to the limited voltage ratings of the IGBTs 20. A DC side reactor 24 is also required in each converter bridge 16 to limit transient current flow between converter limbs 26, and thereby enable the parallel connection and operation of the converter limbs 26. These factors lead to expensive, large and heavy equipment that has significant amounts of stored energy, which makes pre-assembly, testing and transportation of the equipment difficult.

According to an aspect of the invention, there is provided a voltage source converter comprising a converter limb, the converter limb extending between first and second DC terminals and having primary and secondary limb elements connected in parallel between the first and second DC terminals, each DC terminal being connectable to a DC electrical network, the primary limb element including first and second primary limb element portions separated by a third terminal, the third terminal being connectable to an AC electrical network, each primary limb element portion including at least one primary switching element, each primary switching element being switchable to switch the corresponding primary limb element portion into and out of circuit between a respective one of the DC terminals and the third terminal, the secondary limb element including first and second secondary limb element portions separated by a junction, each secondary limb element portion including a DC side chain-link converter, each chain-link converter including a plurality of series-connected modules, each module of each chain-link converter including at least one secondary switching element and at least one energy storage device, the or each secondary switching element and the or each energy storage device in each module combining to selectively provide a voltage source, the converter limb further including a connection interconnecting the third terminal and the junction to form a star configuration in which a first branch of the star configuration includes the connection, a second branch of the star configuration includes the first secondary limb element portion, a third branch of the star configuration includes the second secondary limb element portion and the junction defines a mid-point of the star configuration, wherein the voltage source converter further includes a control unit which controls the switching of each primary switching element to switch the corresponding primary limb element portion into and out of circuit between the corresponding DC terminal and the third terminal to selectively transfer power between the AC and DC electrical networks via each of the primary limb element portions, the control unit further controlling the switching of the or each secondary switching element in each module of each DC side chain-link converter to control the configuration of an AC voltage waveform at the third terminal.

In use, the primary limb element portions provide a primary current path for the transfer of power between the AC and DC electrical networks while the secondary limb element portions, by way of its control of the configuration of the AC voltage waveform at the third terminal, supports the switching of each primary limb element portion into and out of circuit between the corresponding DC terminal and the third terminal.

The control of the configuration of the AC voltage waveform at the third terminal provides control over the voltage experienced by the or each primary switching element in each primary limb element portion and thereby reduces the risk of damage caused by voltage levels exceeding the voltage ratings of the primary switching elements. As such it is more straightforward to design and optimise the voltage source converter because the primary switching elements can be chosen without having to consider the possibility of voltage levels exceeding the voltage ratings of the primary switching elements.

In addition the configuration of the voltage source converter according to the invention enables transfer of high quality power between the AC and DC electrical networks with reduced or zero filtering requirements. This is because each of the DC side chain-link converters is capable of providing a stepped variable voltage source, which permits the generation of a voltage waveform across each chain-link converter using a step-wise approximation and thereby formation of a high quality AC voltage waveform at the third terminal. In contrast, the omission of each DC side chain-link converter from the voltage source converter would result in the problems described earlier with reference to the conventional voltage source converters of FIGS. 1a and 1b.

The configuration of the voltage source converter according to the invention provides savings in terms of its cost, size and footprint as follows.

During the operation of the voltage source converter, power is divided between the primary and secondary limb elements over each power cycle. By using primary switching elements with low conduction losses in the primary limb element portions, the overall conduction losses in the voltage source converter according to the invention can be reduced in comparison to a conventional voltage source converter having the same number of converter limbs, each converter limb including a plurality of modules, an example of which is shown in FIG. 1c. This provides further savings in terms of the cost, size and footprint of the voltage source converter according to the invention.

The DC side chain-link converters of the secondary limb element portions may be controlled to supply DC current to or absorb DC current from the DC electrical network throughout the power cycle and thereby regulate DC ripple, thus limiting or obviating the need for a DC link capacitor which can be large and costly.

When each primary switching element is a naturally commutated switching element (e.g. a thyristor), large snubbing circuitry is normally required to control the rate of change of voltage across each naturally commutated switching element after it has been commutated off. Also, large reactors are required to accommodate the long recovery time between the turn-off and turn-on of the primary switching elements. The inclusion of the DC side chain-link converters however permit fine control of the rate of change of voltage across each naturally commutated switching element and the recovery time between the turn-off and turn-on of each naturally commutated switching element, thus reducing or eliminating the need to include the snubbing circuitry and reactors.

The configuration of the voltage source converter according to the invention therefore results in an economical, space-saving voltage source converter with high voltage capabilities.

In embodiments of the invention the control unit, while both primary limb element portions are switched out of circuit between the respective DC terminal and the third terminal, may control the switching of the or each secondary switching element in each module of each DC side chain-link converter to control the rate of change of voltage at the third terminal. In other words, the control unit may control the switching of the or each secondary switching element in each module of each DC side chain-link converter to control the rate of change of voltage at the third terminal in the period which follows the switching of one of the primary limb element portions out of circuit between the corresponding DC terminal and the third terminal and precedes the switching of the other of the primary limb element portions into circuit between the corresponding DC terminal and the third terminal. Preferably such switching of the or each secondary switching element in each module of each DC side chain-link converter results in the formation of a substantially trapezoidal voltage waveform at the third terminal. Voltage waveforms of other shapes may also be formed, including voltage waveforms having at least two different slopes between positive and negative peak values of waveform.

The capability of the DC side chain-link converters to provide a stepped variable voltage source permits fine control over the rate of change of voltage at the third terminal to prevent the voltage from ramping too quickly between different voltage levels, thereby avoiding the occurrence of fast fronted and high voltage spikes that may otherwise damage or degrade components or their insulation.

The control unit, while both primary limb element portions are switched out of circuit between the respective DC terminal and the third terminal, may control the switching of the or each secondary switching element in each module of each DC side chain-link converter to control the rate of change of voltage at the third terminal to modify the characteristics of the overall AC voltage waveform at the third terminal.

Optionally, the control unit may control the switching of the or each secondary switching element in each module of the DC side chain-link converter to modify the value of each intercept angle of the AC voltage waveform to control the fundamental magnitude of the AC voltage waveform.

Further optionally, the control unit may control the switching of the or each secondary switching element in each module of the DC side chain-link converter to modify the value of each intercept angle of the AC voltage waveform to filter a harmonic component from the AC voltage waveform.

For the purposes of the specification, an intercept angle is defined as a phase angle corresponding to a common point of intersection between two different voltage profiles (e.g. voltage slopes) of the AC voltage waveform, whereby a voltage slope has a constant rate of change of voltage (which can be negative, zero or positive) over a defined period.

Simple harmonic analysis shows that, as the magnitude of each intercept angle increases, the overall harmonic content of the AC voltage waveform reduces to a minima at 0.61 rad which is close to the point where the $5^{th}$ harmonic passes through zero at 0.628 rad. The simple harmonic analysis also shows that the overall harmonic content of the AC voltage waveform rises as the magnitude of each intercept angle further increases beyond 0.628 rad. It follows that, when the voltage source converter is controlled to filter a harmonic component from the AC voltage waveform, the magnitude of each intercept angle is preferably 0.61 rad, 0.628 rad or in the range of 0.61 to 0.628 rad.

It will be noted that the fundamental magnitude of the AC voltage waveform does not vary significantly with the magnitude of each intercept angle. As such, in order to obtain a certain level of operation expected of the voltage source converter, a transformer with a tap changer may be used in combination with a small variation in fundamental magnitude over a selected range to give continuous control over the tap steps.

Alternatively, in order to obtain a certain level of operation expected of the voltage source converter, the AC voltage waveform may be controlled to include a voltage plateau about the phase angle corresponding to zero voltage. To obtain such an AC voltage waveform, the control unit, while both primary limb element portions are switched out of circuit between the respective DC terminal and the third terminal, may control the switching of the or each secondary switching element in each module of each DC side chain-link converter to generate a voltage plateau which is symmetrical about a phase angle $n \cdot (\pi + \phi)$ of the AC voltage waveform at the third terminal, where n is an integer and $\phi$ is a phase shift between a first vector representing an AC voltage of the AC electrical network and a second vector representing the AC voltage waveform at the third terminal. The addition of such a voltage plateau to the AC voltage waveform not only provides control over the fundamental magnitude of the AC voltage waveform, but also permits reduction of the Total Harmonic Distortion (THD) of the AC voltage waveform.

In embodiments of the invention the control unit, prior to one of the primary limb element portions being switched into or out of circuit between the corresponding DC terminal and the third terminal, may control the switching of the or each secondary switching element in each module of each DC side chain-link converter to control the configuration of the AC voltage waveform at the third terminal to minimise a voltage across that primary limb element portion. This allows the or each primary switching element of that limb portion to be switched at near zero voltage and current, thus minimise switching losses.

In further embodiments of the invention the voltage source converter may further include an AC side chain-link converter, a first end of the AC side chain-link converter being connected to the third terminal and a second end of the AC side chain-link converter being connectable to the AC electrical network, the control unit controlling the switching of the or each secondary switching element in each module of the AC side chain-link converter to modify the AC voltage waveform for presentation to the AC electrical network.

It is standard practice to include passive filters at the output of power converters. However, for a grid-connected converter, the inclusion of passive filters has a severe effect on the quadrature termination impedance of the converter. Thus, the passive filters are typically switched, using switchgear, in and out of circuit with the converter in accordance with load conditions. The inclusion of the passive filters and switchgear contributes to the majority of the real estate requirements of an associated power station.

On the other hand the AC side chain-link converter provides the voltage source converter with active filtering capability and thereby further reduces or eliminates the requirements for passive filtering at the third terminal of the voltage source converter, thus reducing the real estate requirements of the voltage source converter.

In embodiments employing the use of an AC side chain-link converter the control unit may control the switching of the or each secondary switching element in each module of the AC side chain-link converter to modify the AC voltage waveform to follow a voltage locus consisting of only a fundamental component and at least one selected harmonic component of the AC voltage waveform. This permits simplification of the control scheme for the AC side chain-link converter because otherwise it would be necessary to perform a complicated harmonic analysis of the AC voltage waveform to separate out the or each unwanted harmonic component.

Each energy storage device may be any device that is capable of storing or releasing energy, e.g. a capacitor or battery. Each energy storage device must be rated to account for the rise or fall in voltage level caused by the combination of AC and DC currents in each DC side chain-link converter during its operation to control the configuration of the AC voltage waveform at the third terminal. A rise or fall in voltage level of each energy storage device may also occur as a result of the control of each DC side chain-link converter to balance the voltage levels of its energy storage devices.

Each DC side chain-link converter may be controlled to correct for any net variation in energy due to a rise or fall in energy level of each DC side chain-link converter when both primary limb element portions are respectively switched out of circuit between the corresponding DC terminal and the third terminal to maintain a specific voltage level of each of its energy storage devices. For example, the control unit may control the switching of the or each secondary switching element in each module of each DC side chain-link converter to discharge surplus energy from the DC side chain-link converter of the first secondary limb element portion or inject energy from the DC electrical network into the DC side chain-link converter of the first secondary limb element portion while the first primary limb element portion is not in conduction and the second primary limb element portion is in conduction and to discharge surplus energy from the DC side chain-link converter of the second secondary limb element portion or inject energy from the DC electrical network into the DC side chain-link converter of the second secondary limb element portion while the second primary limb element portion is not in conduction and the first primary limb element portion is in conduction.

Each module may be a unidirectional voltage source that can provide zero or non-zero voltage and can conduct current in two directions, i.e. each module may be a 2-quadrant unipolar module. For example, each module may include a pair of secondary switching elements connected in parallel with an energy storage device in a half-bridge arrangement to define a 2-quadrant unipolar module that can provide zero or positive voltage and can conduct current in two directions.

Each module may be a bidirectional voltage source that can provide negative, zero or positive voltage and can conduct current in two directions, i.e. each module may be a 4-quadrant bipolar module. For example, each module may include two pairs of secondary switching elements connected in parallel with an energy storage device in a full-bridge arrangement to define a 4-quadrant bipolar module that can provide negative, zero or positive voltage and can conduct current in two directions.

The modular arrangement of each chain-link converter means that it is straightforward to increase or decrease the number of modules in each chain-link converter to achieve a desired voltage rating or filtering capability.

Each primary switching element may be a self-commutated switching element such as, for example, an insulated gate bipolar transistor, a gate turn-off thyristor, a field effect transistor, an injection-enhanced gate transistor or an integrated gate commutated thyristor.

Each primary switching element may be a naturally commutated switching element such as, for example, a thyristor or a diode. The use of at least one naturally-commutated switching device in each primary limb element portion not only improves the robustness of the primary limb element portions, but also makes the primary limb element portions capable of withstanding surge currents that might occur due to faults in the DC electrical network. In such embodiments employing the use of naturally commutated switching elements as the primary switching elements, each module of each DC side chain-link converter is preferably a 4-quadrant bipolar module which can be switched to block the aforementioned surge currents.

It will be understood that the control unit can control the switching of each primary switching element either by sending a turn-on or turn-off control signal to each primary switching element or by controlling the switching of the or each secondary switching element in each module of each DC side chain-link converter to control the configuration of the AC voltage waveform of the third terminal to selectively cause switching of each primary switching element, depending on the type of primary switching element used.

The configuration of the voltage source converter according to the invention permits simplification of the design and construction of the primary limb element portions without adversely affecting the performance of the voltage source converter according to the invention. For example, each primary limb element portion may include a single primary switching element or a plurality of primary switching elements connected in series between the corresponding DC terminal and the third terminal. Switching elements with high voltage ratings can be selected for use in the primary limb element portions to further reduce the footprint of the voltage source converter and thereby minimise the real estate costs of the associated power station.

In embodiments of the invention, the control unit may control the switching of the or each secondary switching element in each module of each DC side chain-link converter to control the configuration of the AC voltage waveform at the third terminal to selectively transfer power from the voltage source converter to the AC electrical network. This enables the voltage source converter to provide a small amount of power to the AC electrical network for, for example, energising auxiliary electronics of a wind farm forming part of the AC electrical network at start-up, thus omitting the need for additional equipment to energise the auxiliary electronics.

Optionally, when each primary switching element is a naturally commutated switching element, the control unit may control the switching of the or each secondary switching element in each module of each DC side chain-link converter to control the configuration of the AC voltage waveform at the third terminal to selectively commutate each primary switching element in response to a fault occurring, in use, in the AC or DC electrical network.

In the event of a fault occurring, in use, in the AC or DC electrical network, each DC side chain-link converter can be controlled to rapidly commutate off the or each primary switching element of the corresponding primary limb element portion to limit or prevent the fault current, depending on the time taken to achieve the commutation.

Further optionally, the control unit may control the switching of the or each primary switching element to form a current bypass path to permit a current flowing in the voltage source converter to flow through the current bypass path and thereby bypass each DC side chain-link converter in response to a fault occurring, in use, in the AC or DC electrical network. This prevents the fault current from damaging the components of each module of each DC side chain-link converter.

Thus, the use of the voltage source converter components to limit or prevent the fault current reduces or eliminates the need for the installation of separate fault protection equipment. This leads to savings in terms of hardware size, weight and costs.

Optionally each primary limb element portion may include at least one pair of primary switching elements connected in anti-parallel so that each primary limb element portion can conduct current in two directions. This allows the voltage source converter to be configured to transfer power between the AC and DC electrical networks in both directions. Each primary switching element of the or each pair of primary switching elements may include a single switching device or a plurality of series- and/or parallel-connected switching devices.

The voltage source converter may be a multi-phase voltage source converter. In embodiments of the invention in which the voltage source converter is connectable to a multi-phase AC electrical network, the voltage source converter may include a plurality of converter limbs, the third terminal of each converter limb being connectable to a respective phase of a multi-phase AC electrical network.

In embodiments of the invention, the control unit may be further configured to selectively control switching of the or each secondary switching element in each module of at least one of the DC side chain-link converters so as to inject a filtering current into the DC side of the voltage source converter and thereby minimise or cancel one or more harmonic components in a DC voltage presented to the DC electrical network.

Conventionally a DC link capacitor or other filtering hardware is used in combination with a voltage source converter to help reduce DC voltage ripple in a DC voltage presented to a DC electrical network. In order to minimise the DC voltage ripple (e.g. to ±1% of the DC voltage presented to the DC electrical network), the size of the associated DC link capacitor or other filtering hardware can be considerable.

Injection of the filtering current by at least one DC side chain-link converter of the voltage source converter according to the invention permits minimisation or cancellation of one or more harmonic components in the DC voltage presented to the DC electrical network, thus reducing DC voltage ripple in the DC voltage. This in turn reduces the required size of the associated DC link capacitor or other filtering hardware (or eliminates the need for the associated DC link capacitor or other filtering hardware), thus reducing the overall size, weight and cost of the voltage source converter. More particularly, injecting the filtering current at a suitable phase and amplitude could enable reduction of the size of the associated DC link capacitor or other filtering hardware by a factor of up to several times (or eliminate the need for the associated DC link capacitor or other filtering hardware).

In addition, each of the DC side chain-link converters is capable of providing a stepped variable voltage source, which permits the generation of a voltage waveform across each chain-link converter using a step-wise approximation and thereby enables formation of the filtering current required to minimise or cancel one or more harmonic components in the DC voltage presented to the DC electrical network.

Furthermore the use of the DC side chain-link converters to both control the configuration of the AC voltage waveform at the third terminal and inject the filtering current results in a cost-efficient and energy-efficient voltage source converter in comparison to a combination of a conventional voltage source converter and a DC link capacitor or other filtering hardware.

The configuration of the voltage source converter in this manner therefore results in an economical, space-saving voltage source converter with excellent DC filtering capabilities.

The first primary and secondary limb element portions may define a first limb portion. The second primary and secondary limb element portions may define a second limb portion.

In embodiments of the invention, the control unit may be configured to selectively control switching of the or each secondary switching element in each module of the DC side chain-link converter of one of the first and second limb portions so as to inject the filtering current into the DC side of the voltage source converter when the or each primary switching element of the other of the first and second limb portions is switched to switch the corresponding primary limb element portion into circuit between the respective DC terminal and the third terminal. The configuration of the control unit in this manner provides a reliable means of carrying out active DC side filtering of the DC voltage presented to the DC electrical network during transfer of power between the AC and DC electrical networks.

The control unit may be configured to control switching of the or each secondary switching element in each module of the DC side chain-link converter of the other of the first and second limb portions to configure that DC side chain-link converter as a current source, optionally as a current source with a current reference of zero.

Configuring the DC side chain-link converter of the other of the first and second limb portions as a current source inhibits current from passing through that DC side chain-link converter when the primary limb element portion of the other of the first and second limb portions is switched into circuit between the respective DC terminal and the third terminal, thus inhibiting that DC side chain-link converter from affecting the AC voltage waveform at the third terminal.

Further configuring the DC side chain-link converter of the other of the first and second limb portions as a current source with a current reference of zero enables that DC side chain-link converter to be readily operated to not only drive a current into the or primary switching element of the same limb portion when the primary limb element portion of the same limb portion is initially switched into circuit between the respective DC terminal and the third terminal, but also to provide commutation of the or each primary switching element of the same limb portion when the primary limb element portion of the same limb portion is to be switched out of circuit between the respective DC terminal and the third terminal.

The control unit may be configured to control switching of the or each secondary switching element in each module of each DC side chain-link converter to configure one of the DC side chain-link converters as a voltage source and the other of the DC side chain-link converters as a current source when both primary limb element portions are switched out of circuit between the respective DC terminal and the third terminal.

Configuring the DC side chain-link converters respectively as a voltage source and a current source in this manner enables reliable operation of the voltage source converter when the control unit controls switching of the or each secondary switching element in each module of each DC side chain-link converter to control the rate of change of voltage at the third terminal.

The control unit may be configured to control switching of the or each secondary switching element in each module of each DC side chain-link converter to change between:
(a) a first arrangement in which a first of the DC side chain-link converters is configured as a voltage source and a second of the DC side chain-link converters is configured as a current source; and
(b) a second arrangement in which the second of the DC side chain-link converters is configured as a voltage source and the first of the DC side chain-link converters is configured as a current source,
when both primary limb element portions are switched out of circuit between the respective DC terminal and the third terminal.

Configuring each DC side chain-link converter to alternate between a voltage source and a current source in this manner allows part of the AC voltage waveform at the third terminal to be controlled by one of the DC side chain-link converters, and the remaining part of the AC voltage waveform at the third terminal to be controlled by the other of the DC side chain-link converters when both primary limb element portions are switched out of circuit between the respective DC terminal and the third terminal. This enables the current flowing from the AC electrical network into the third terminal to be directed to the appropriate DC terminal when both primary limb element portions are switched out of circuit between the respective DC terminal and the third terminal, so that the current and voltage of the resulting rectified waveform are in phase, thereby maximising the transfer of power by the voltage source converter.

The DC side chain-link converter configured as a current source when both primary limb element portions are switched out of circuit between the respective DC terminal and the third terminal may be configured as a current source with a current reference of zero.

In embodiments of the invention in which the voltage source converter includes a plurality of converter limbs, the control unit may be configured to control switching of the or each secondary switching element in each module of at least one of the DC side chain-link converters to circulate the filtering current through at least two of the plurality of converter limbs. Such circulation of the filtering current through at least two of the plurality of converter limbs can be used in combination with a multi-phase power transfer operation of the voltage source converter in which the primary limb elements of at least two of the plurality of converter limbs at any one time are in conduction.

The control unit may be configured to detect a presence of at least one harmonic component in the DC voltage presented to the DC electrical network and to selectively control switching of the or each secondary switching element in each module of at least one of the DC side chain-link converters to inject the filtering current into the DC side of the voltage source converter so as to minimise or cancel the or each detected harmonic component in the DC voltage presented to the DC electrical network. This results in a responsive voltage source converter that is capable of generating a suitable filtering current even when one or more unexpected harmonic components are present in the DC voltage presented to the DC electrical network.

To detect a presence of at least one harmonic component in the DC voltage presented to the DC electrical network, the control unit may include a feedback controller configured to monitor DC voltage ripple in the DC voltage presented to the DC electrical network and/or include at least one band-pass filter tuned to a specific harmonic frequency.

In further embodiments of the invention, the control unit may be configured to control the switching of the or each secondary switching element in each module of at least one of the DC side chain-link converters to generate an AC voltage waveform at the third terminal, the AC voltage waveform including an AC voltage waveform portion between positive and negative peak values of the AC voltage waveform, the AC voltage waveform portion including at least two different voltage profiles to filter one or more harmonic components from the AC voltage waveform, at least one of the different voltage profiles being defined by a non-zero voltage slope.

As mentioned earlier, for the purposes of this specification, a voltage slope has a constant rate of change of voltage (which can be negative, zero or positive) over a defined period. It follows that a non-zero voltage slope has a negative or positive constant rate of change of voltage over a defined period, and a zero voltage slope has a zero rate of change of voltage over a defined period.

The AC voltage waveform portion including at least two different voltage profiles has at least one common point of intersection between different voltage profiles over the period of the AC voltage waveform portion.

At least two of the different voltage profiles may be defined by different voltage slopes. Hence, an AC voltage waveform portion including at least two different voltage slopes has at least two different constant rates of change of voltage and at least one common point of intersection between different voltage slopes over the period of the AC voltage waveform portion. For example, when the AC voltage waveform portion has first and second different voltage slopes (i.e. first and second constant rates of change of voltage which are different to each other), at least one section of the AC voltage waveform portion has the first voltage slope (i.e. the first constant rate of change of voltage), at least one other section of the AC voltage waveform portion has the second voltage slope (i.e. the second constant rate of change of voltage) and the AC voltage waveform portion includes at least one common point of intersection between sections with different voltage slopes.

At least one of the different voltage profiles may be defined by an instantaneous change in voltage.

It will be appreciated that, since at least one of the different voltage profiles of the AC voltage waveform portion is defined by a non-zero voltage slope, the AC voltage waveform portion is distinguished from a stepped voltage waveform (e.g. a square or rectangular voltage waveform) that consists of vertical and horizontal sections. This is because the vertical section of the stepped voltage waveform is defined by an instantaneous change in voltage and thereby does not have a defined voltage slope, while the horizontal section is defined by a zero voltage slope.

The inclusion of at least two different voltage profiles in the AC voltage waveform portion, with at least one of the different voltage profiles being defined by a non-zero voltage slope, as described above increases the number of degrees of freedom of the AC voltage waveform, the degrees of freedom being given by the values of the voltage profiles of the AC voltage waveform portion which correspond to each point at which the respective voltage profile in the AC voltage waveform portion intersects with another voltage profile. It will be appreciated that the number of voltage profiles in the AC voltage waveform portion may be varied to adjust the number of degrees of freedom of the AC voltage waveform.

The control unit may be configured to control the switching of the or each secondary switching element in each module of at least one of the DC side chain-link converters to control the configuration of the AC voltage waveform portion at the third terminal when both primary limb element portions are switched out of circuit between the respective DC terminal and the third terminal.

The increased number of degrees of freedom of the AC voltage waveform enables the control unit to control the switching of the or each secondary switching element in each module of the DC side chain-link converters to generate an AC voltage waveform in a manner that permits filtering of one or more harmonic components from the AC voltage waveform, examples of which are as follows.

Optionally, the control unit may be configured to control the switching of the or each secondary switching element in each module of at least one of the DC side chain-link converters to modify the value of each intercept angle of the AC voltage waveform and thereby filter out one or more harmonic components from the AC voltage waveform, each intercept angle defining a phase angle corresponding to a common point of intersection between two different voltage profiles of the AC voltage waveform.

Further optionally, the control unit may be configured to control the switching of the or each secondary switching element in each module of at least one of the DC side chain-link converters to modify the magnitude of the AC voltage waveform corresponding to each intercept angle of the AC voltage waveform and thereby filter out one or more harmonic components from the AC voltage waveform, each intercept angle defining a phase angle corresponding to a common point of intersection between two different voltage profiles of the AC voltage waveform.

The capability of the voltage source converter to generate, at the third terminal, an AC voltage waveform including an AC voltage waveform portion with at least two different voltage profiles, with at least one of the different voltage profiles being defined by a non-zero voltage slope, therefore enables the voltage source converter to transfer high quality power between the AC and DC electrical networks.

Preferred embodiments of the invention will now be described, by way of example only, with reference to the accompanying drawings in which.

Figure 2:
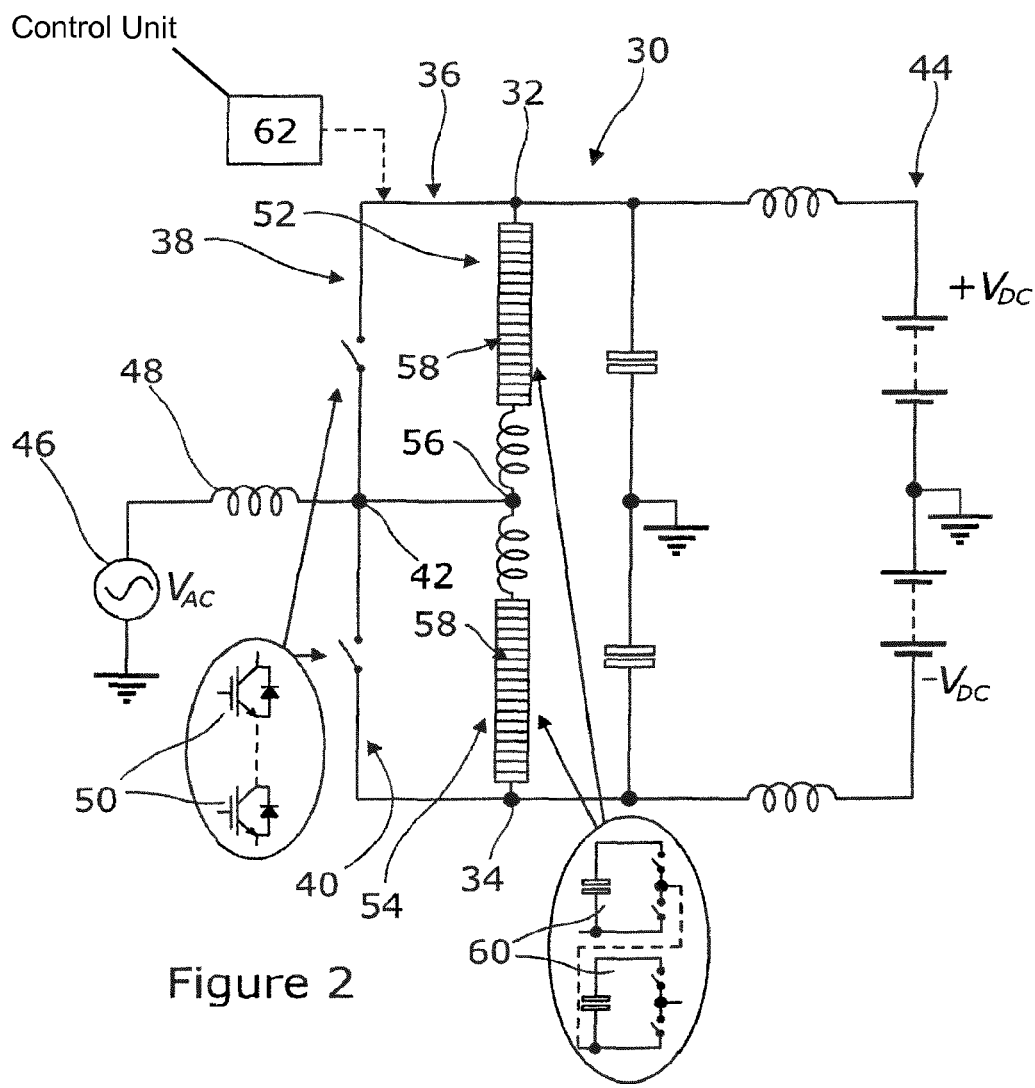
FIG. 2 shows, in schematic form, a voltage source converter according to a first embodiment of the invention.
Figure 7:
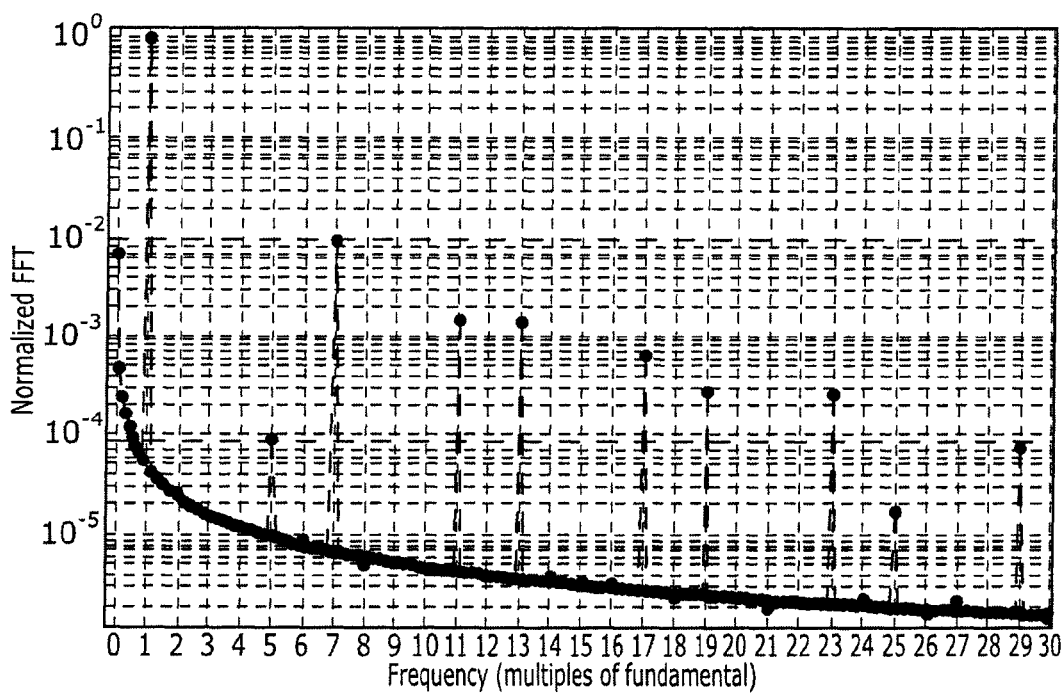
Figure 8:
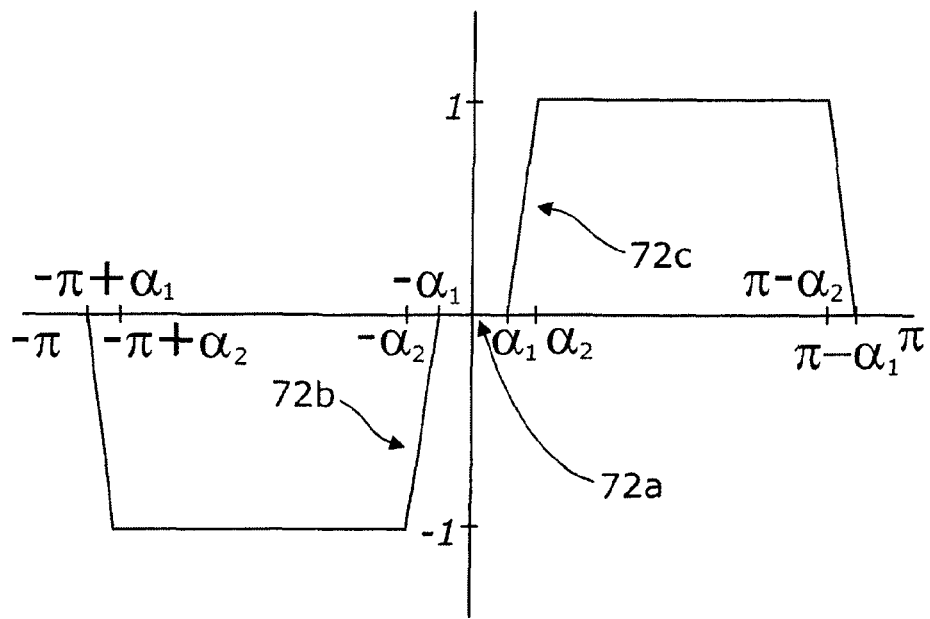
Figure 9:
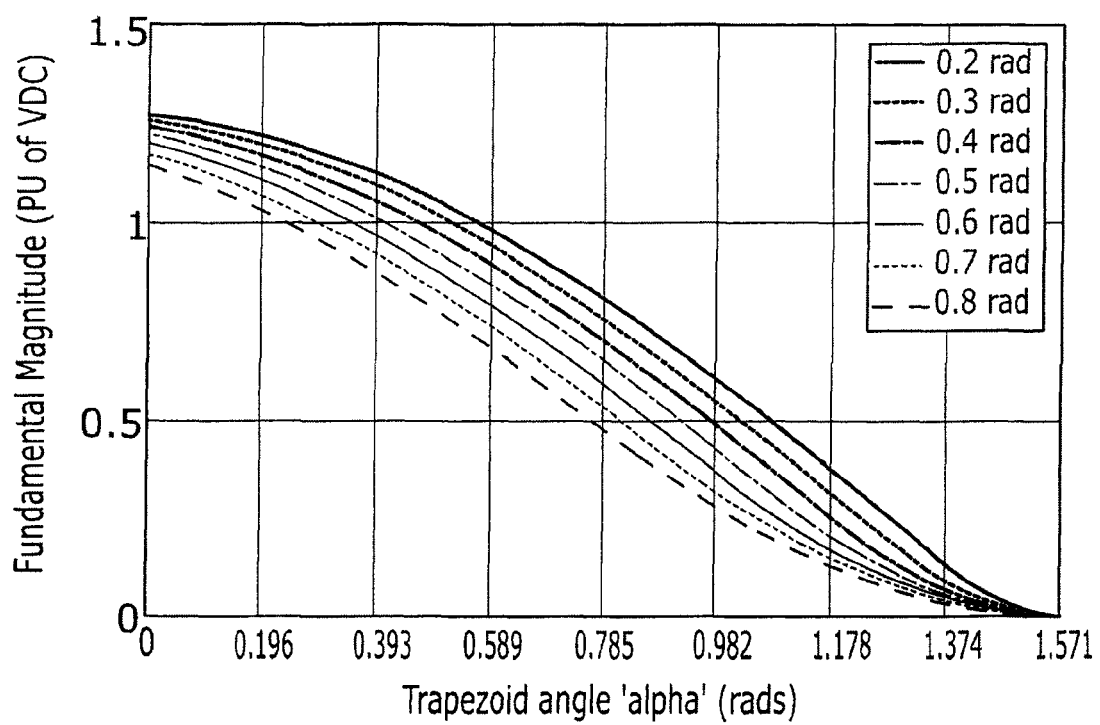
Figure 10:
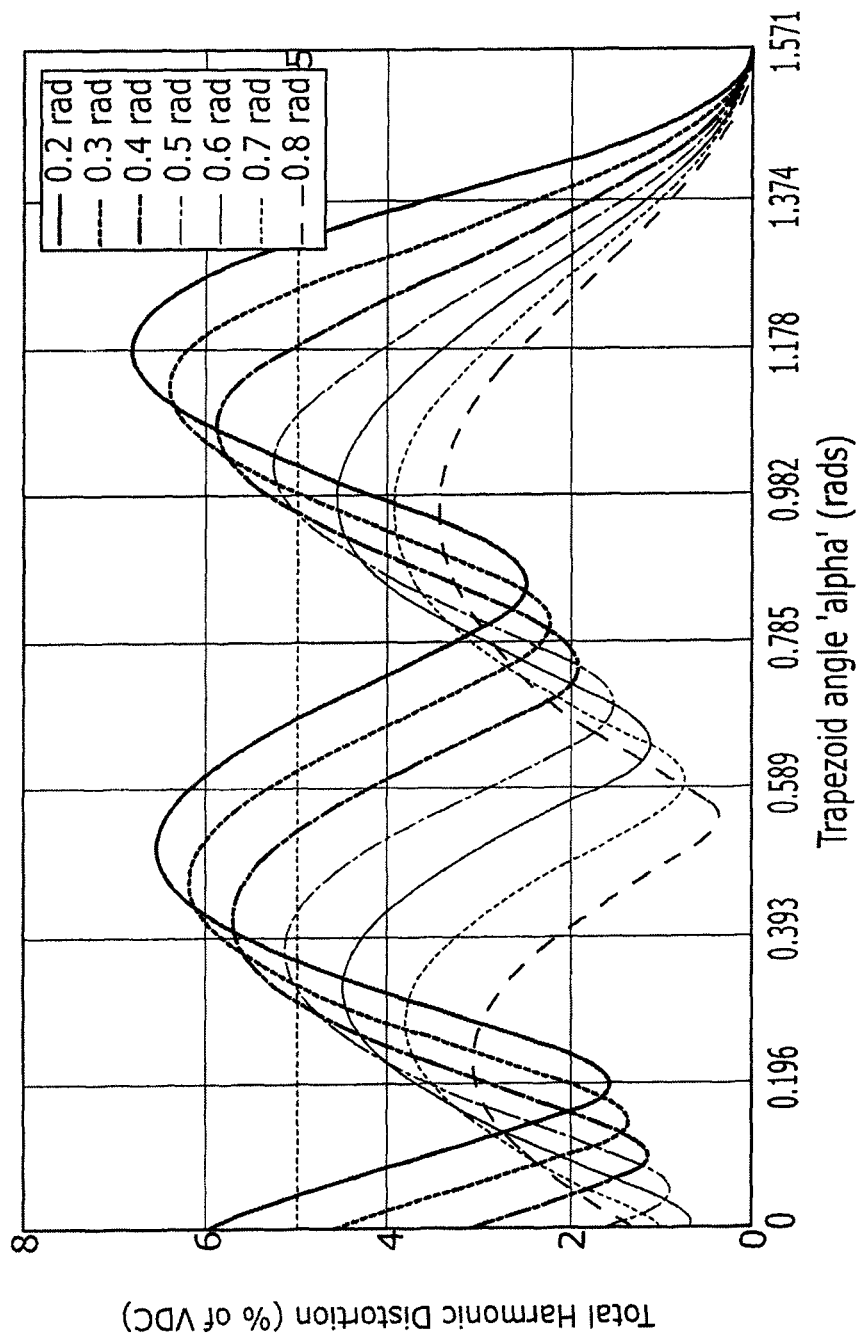

FIG. 7 which illustrates, in graph form, a frequency analysis of the AC phase current at the third terminal of the voltage source converter of FIG. 2 for an intercept angle $\alpha$ of 0.628 rad;

FIG. 8 illustrates, in graph form, another AC voltage waveform generated, in use, at a third terminal of the voltage source converter of FIG. 2 in which the AC voltage waveform includes a voltage plateau between $-\alpha_1$ and $+\alpha_1$ for controlling its fundamental magnitude;

FIG. 9 illustrates, in graph form, a variation in fundamental magnitude against $\alpha_1$ for a range of difference values between different intercept angles, $\alpha_1$ and $\alpha_2$;

FIG. 10 illustrates, in graph form, the total harmonic distortion (THD) of the AC voltage waveform against $\alpha_1$ for a range of difference values between different intercept angles $\alpha_1$ and $\alpha_2$.

Figure 3:
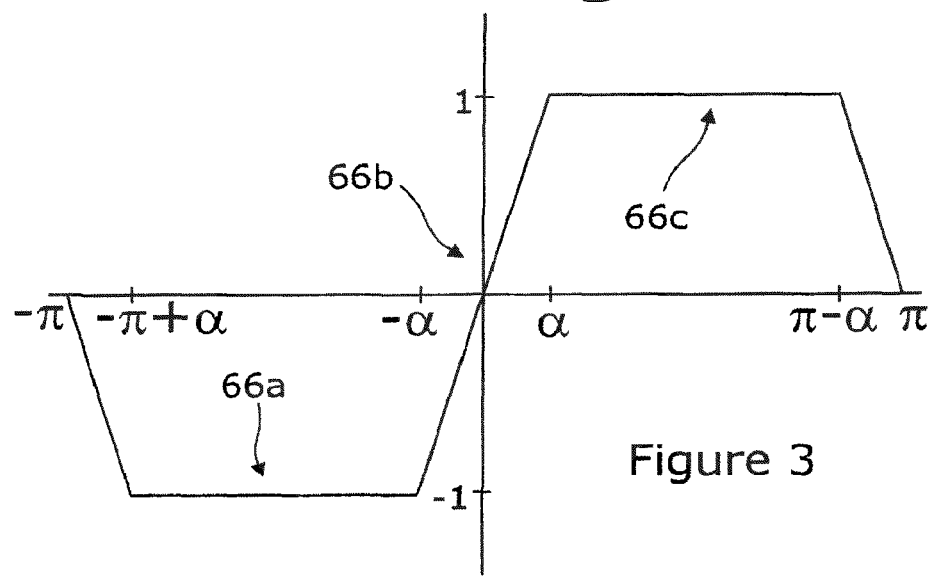
FIG. 3 illustrates, in graph form, an AC voltage waveform generated, in use, at a third terminal of the voltage source converter of FIG. 2.
Figure 11:
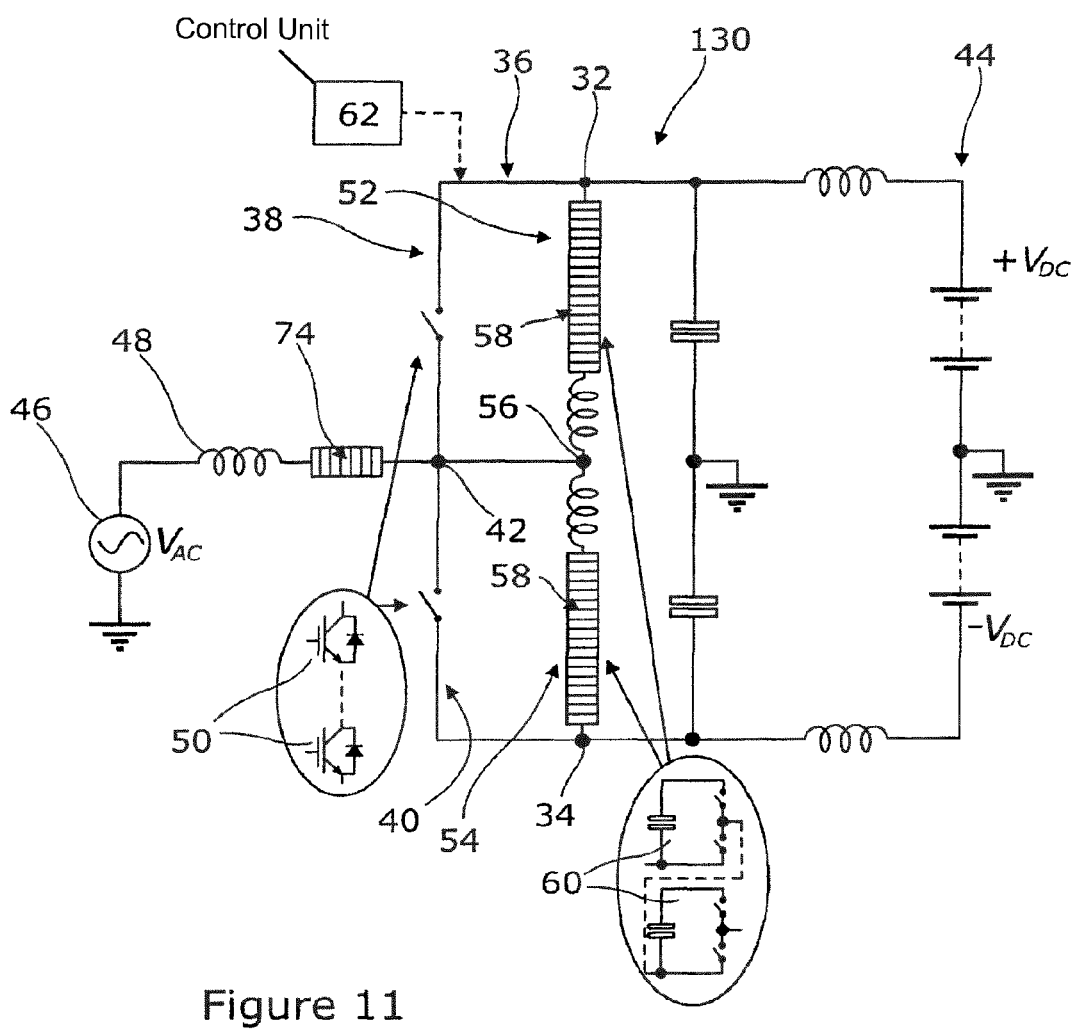
Figure 12:
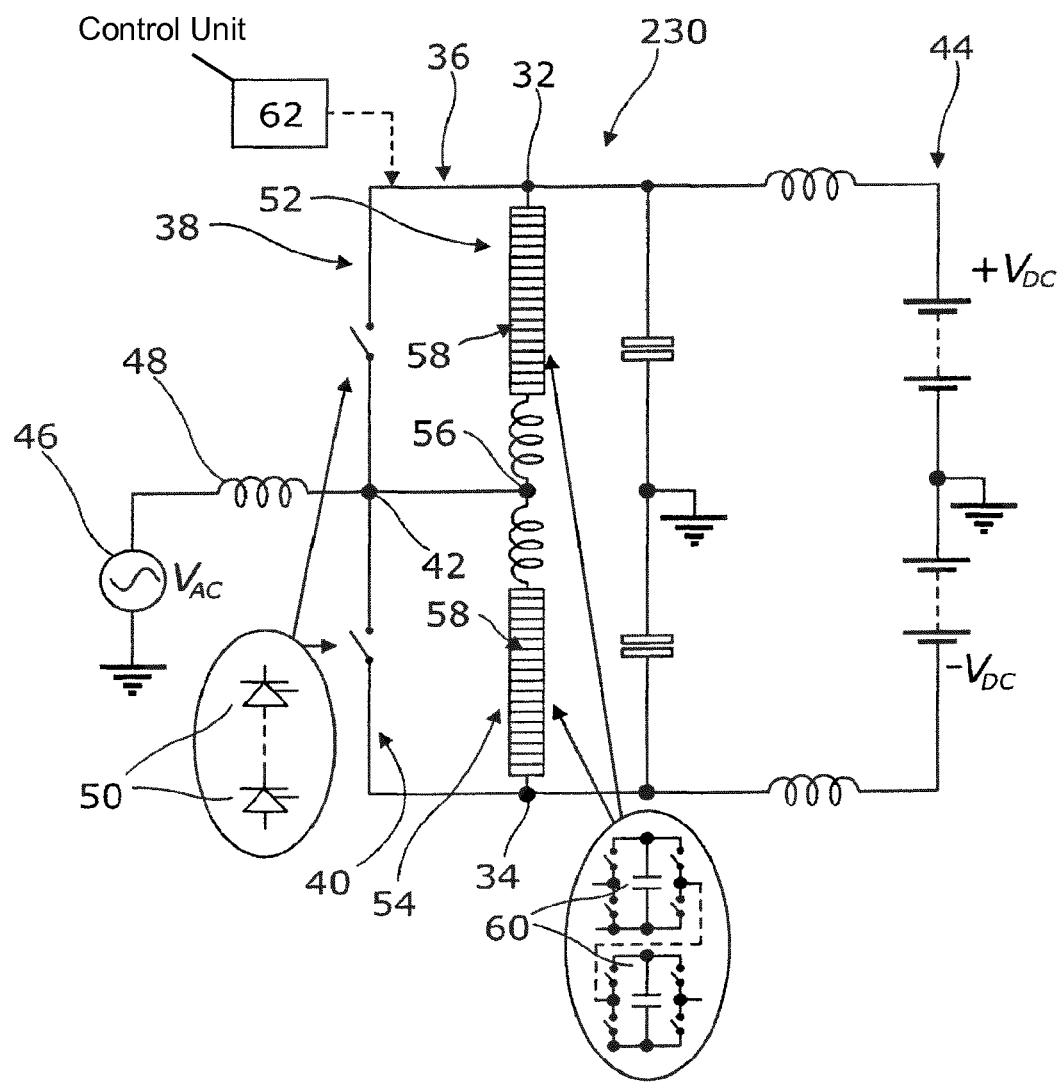
Figure 13:
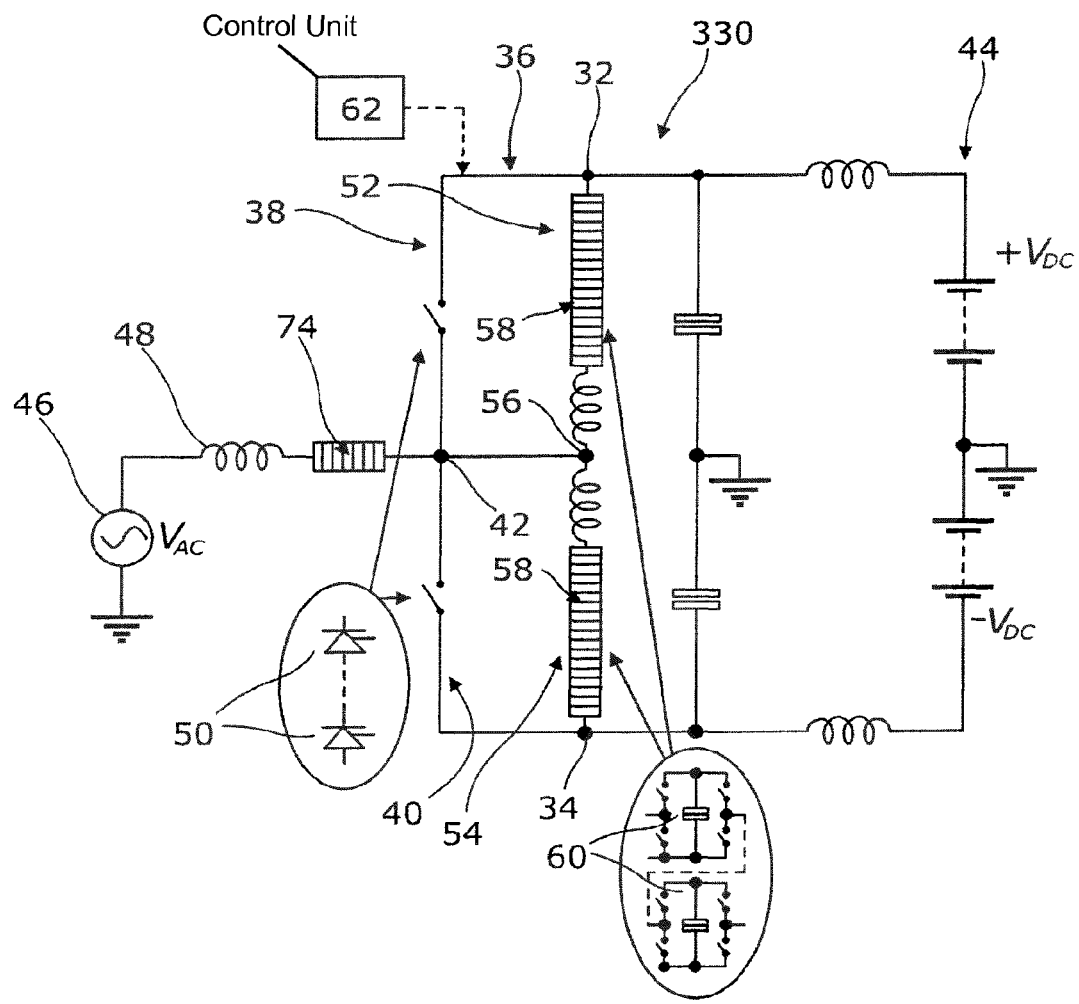
Figure 14:
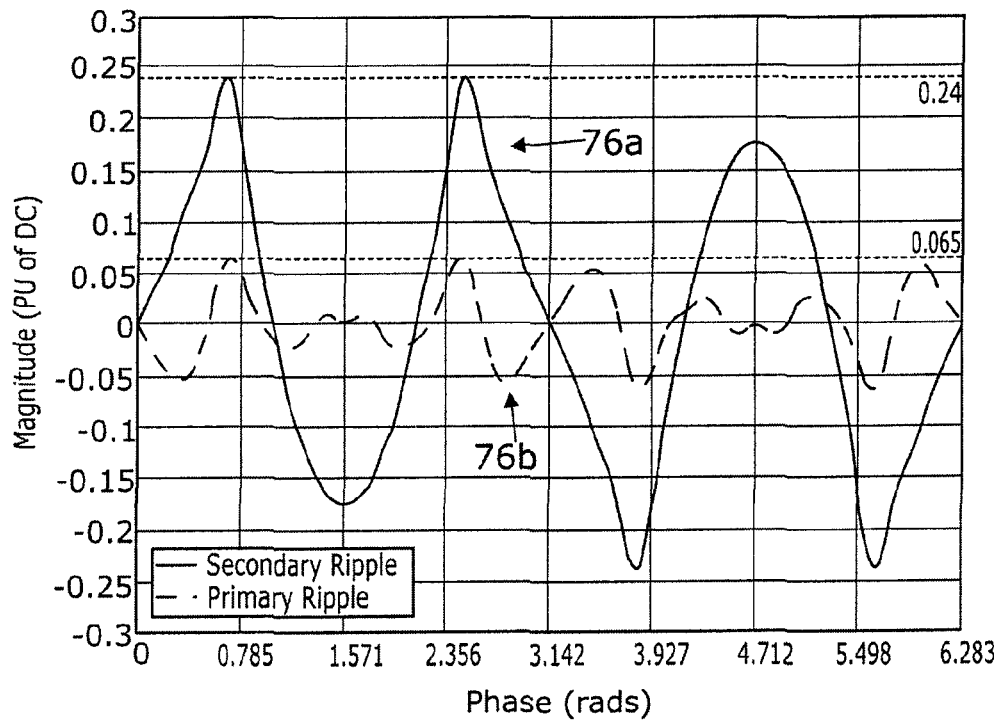
Figure 15:
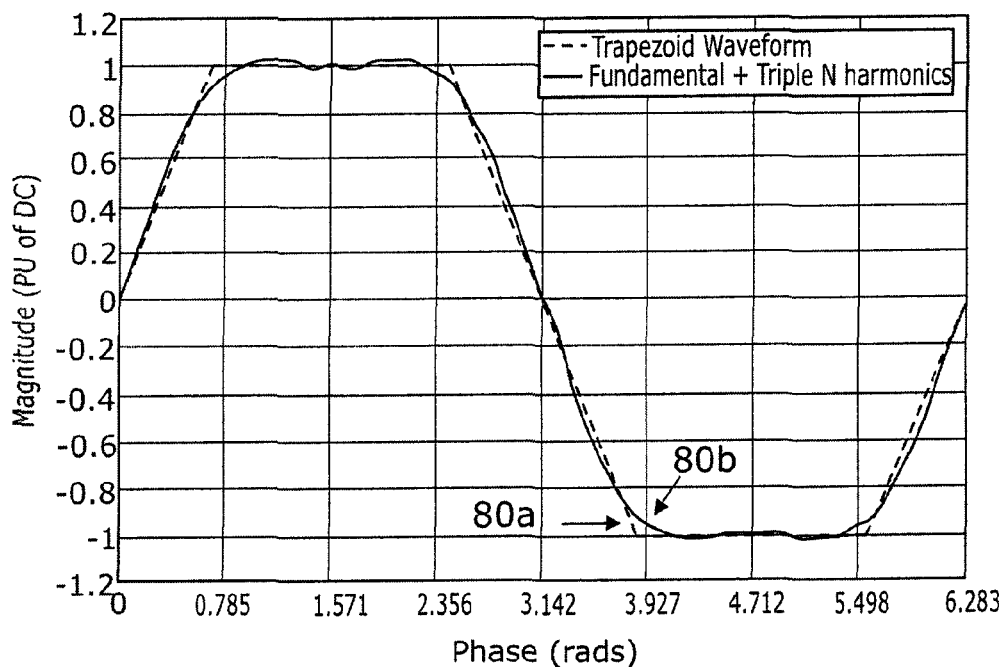
Figure 18:
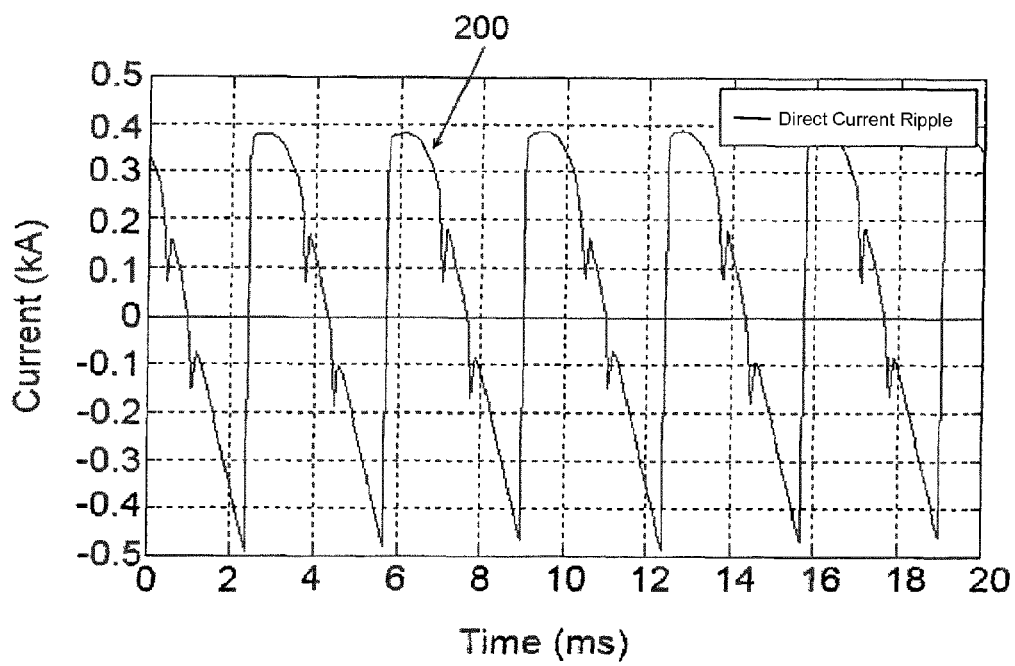
Figure 19:
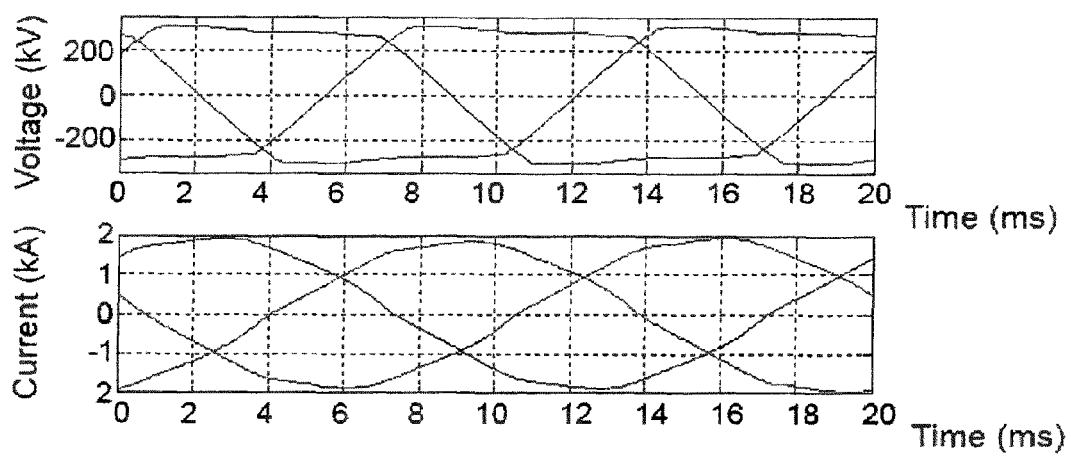
Figure 20:
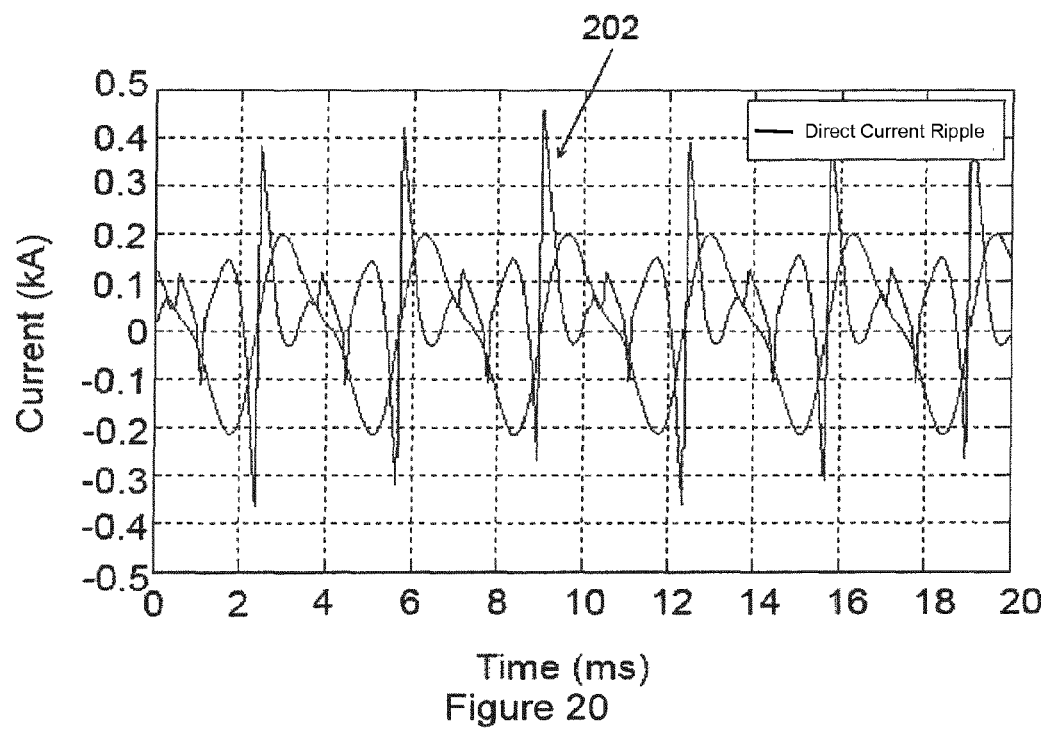
Figure 21:
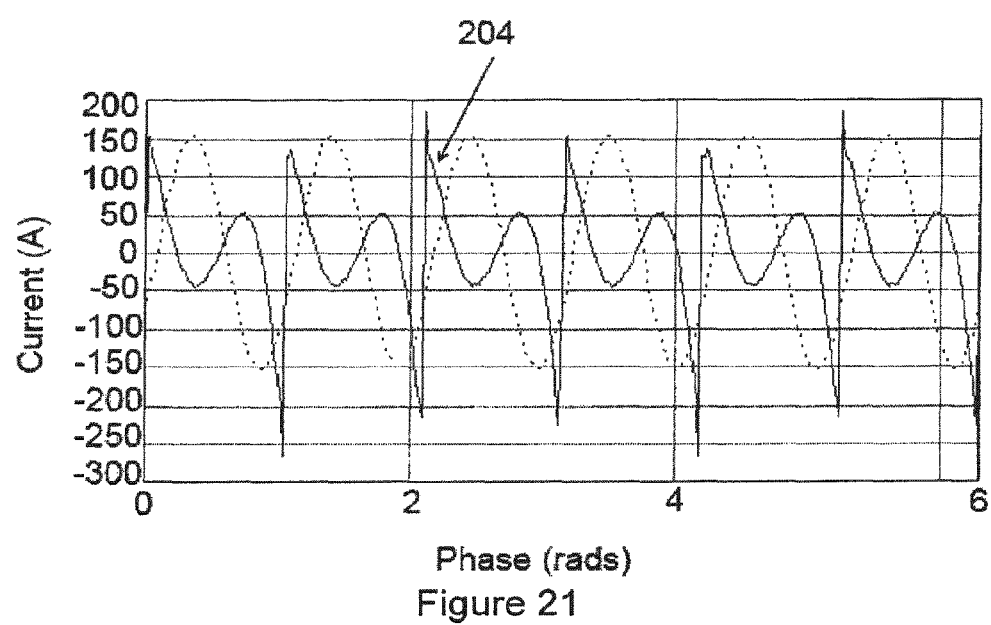
Figure 22:
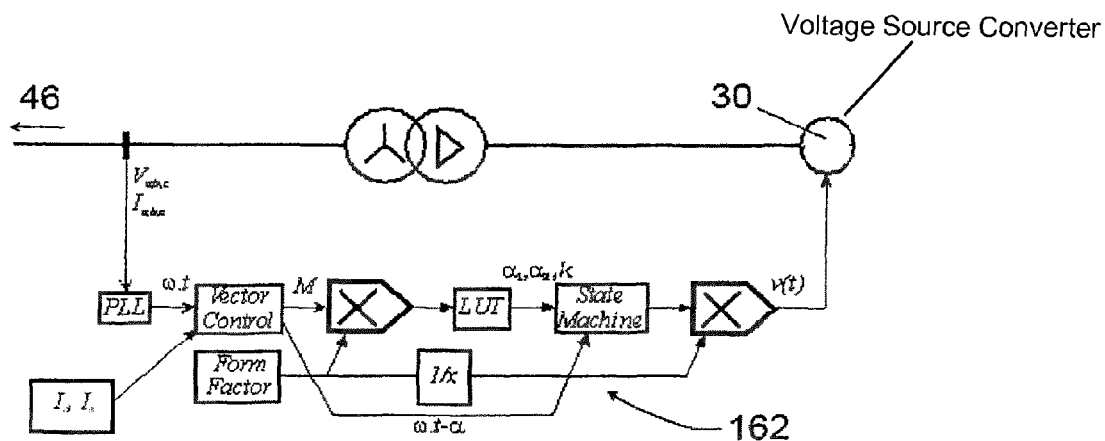
Figure 25:
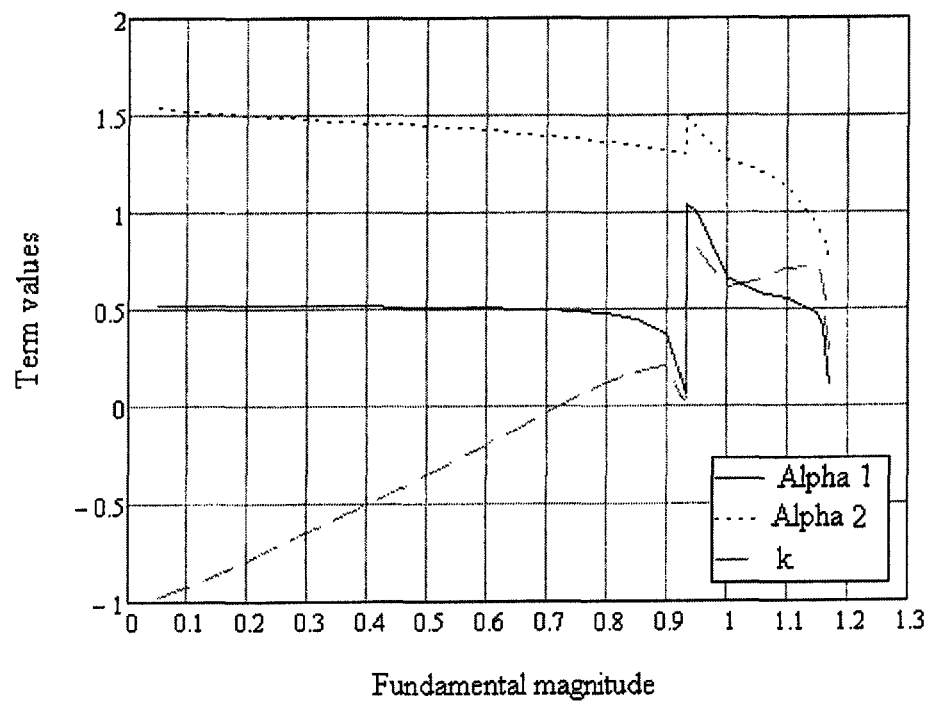
Figure 26:
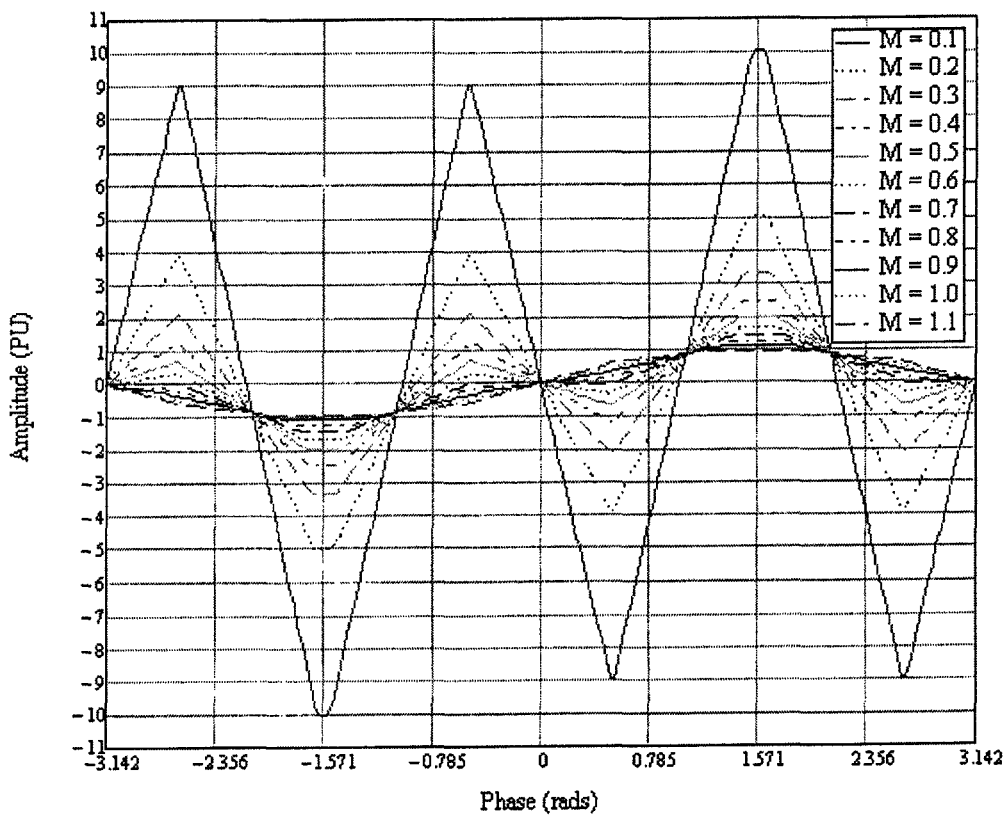
Figure 27A:
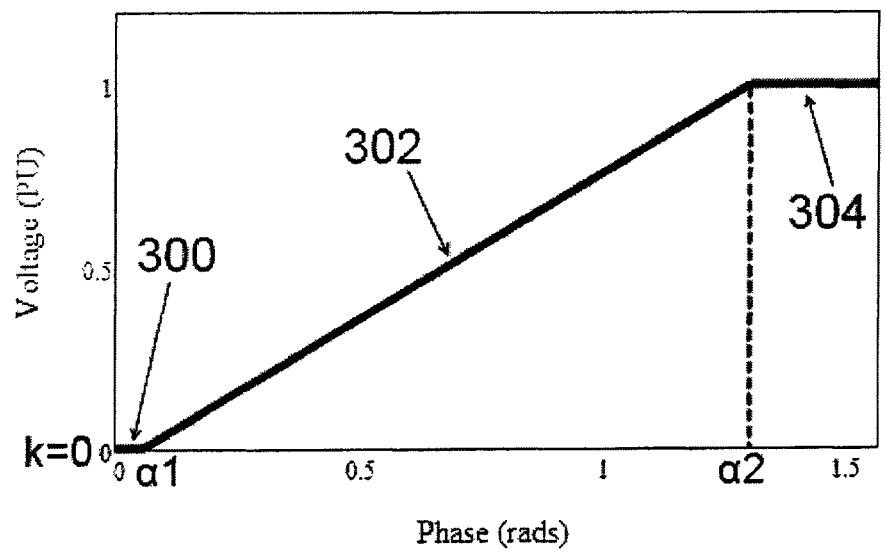
Figure 27B:
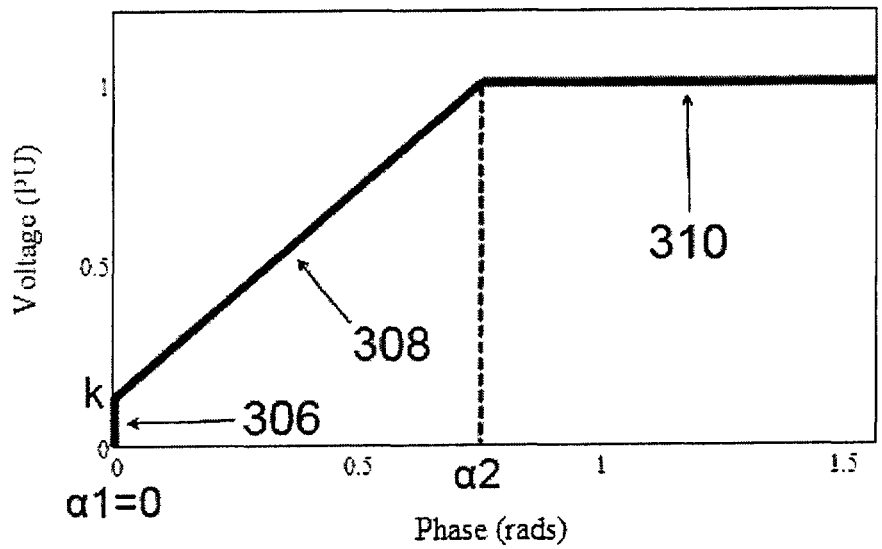
Figure 27C:
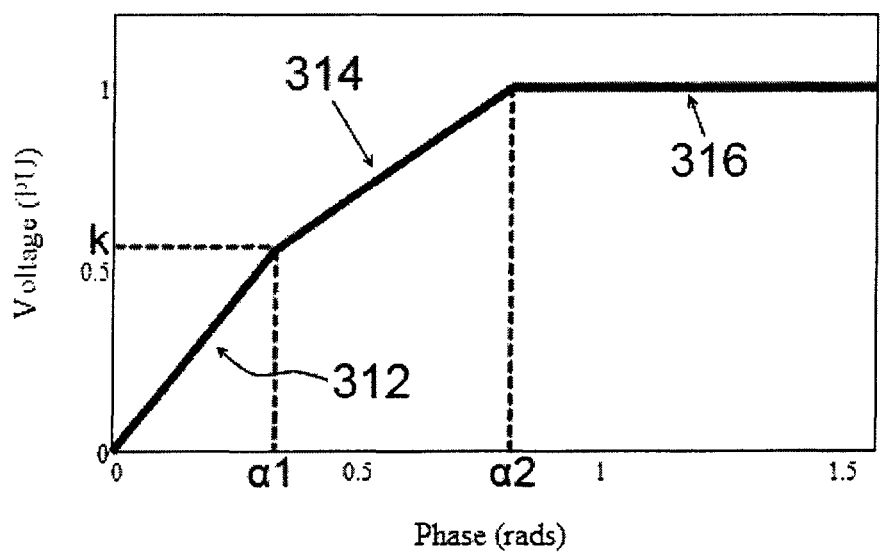

FIG. 11 shows, in schematic form, a voltage source converter according to a second embodiment of the invention;

FIG. 12 shows, in schematic form, a voltage source converter according to a third embodiment of the invention;

FIG. 13 shows, in schematic form, a voltage source converter according to a fourth embodiment of the invention;

FIG. 14 illustrates, in graph form, super harmonic ripples for an unfiltered AC voltage waveform, including all super harmonics up to the 19$^{th}$ harmonic, respectively present at a secondary winding and a primary winding of a star-delta transformer;

FIG. 15 compares, in graph form, the AC voltage waveform at a third terminal of a voltage source converter with a "filtered" AC voltage waveform which follows a voltage locus consisting of only fundamental and triple N harmonic components of the AC voltage waveform;

FIG. 16 illustrates, in graph form, a comparison between the AC voltage waveform of FIG. 3 and an AC supply voltage of a connected AC electrical network;

FIG. 17 illustrates, in table form, the configuration of a voltage source converter according to a seventh embodiment of the invention during its operation to generate the AC voltage waveform of FIG. 3;

FIG. 18 illustrates, in graph form, a direct current ripple generated by the voltage source converter according to the seventh embodiment of the invention in the absence of a filtering current to cancel harmonic components in the direct current ripple;

FIG. 19 illustrates, in graph form, AC voltage and current variations in a transformer secondary of a connected star-delta transformer during generation of the direct current ripple of FIG. 18;

FIG. 20 illustrates, in graph form, a direct current ripple generated by the voltage source converter according to the seventh embodiment of the invention when a filtering current is injected to cancel 6$^{th}$ and 12$^{th}$ harmonic components in the direct current ripple;

FIG. 21 illustrates, in graph form, a theoretically ideal direct current ripple achievable under idealised operating conditions of the voltage source converter according to the seventh embodiment of the invention when a filtering current is injected to cancel 6$^{th}$ and 12$^{th}$ harmonic components in the direct current ripple;

FIG. 22 shows, in schematic form, a control unit forming part of a voltage source converter according to a ninth embodiment of the invention;

FIGS. 23 to 26 illustrate, in graph form, the operation of the voltage source converter according to the ninth embodiment of the invention; and FIGS. 27a to 27c illustrate, in graph form, further examples of the operation of the voltage source converter according to a ninth embodiment of the invention.

A first voltage source converter 30 according to a first embodiment of the invention is shown in FIG. 2.

The first voltage source converter 30 comprises first and second DC terminals 32,34 and a converter limb 36.

The converter limb 36 extends between the first and second DC terminals 32,34, and has primary and secondary limb elements connected in parallel between the first and second DC terminals 32,34.

The primary limb element includes first and second primary limb element portions 38,40 separated by a third terminal 42. In other words, the first primary limb element portion 38 is connected between the first DC terminal 32 and the third terminal 42, and the second primary limb element portion 40 is connected between the second DC terminal 34 and the third terminal 42.

In use, the first and second DC terminals 32,34 are respectively connected to positive and negative terminals of a DC electrical network 44, the positive and negative terminals of the DC electrical network 44 carrying voltages of +Vdc and −Vdc respectively, and the third terminal 42 is connected to an AC electrical network 46 via a phase reactance 48, Each primary limb element portion 38,40 includes a director switch, which includes a plurality of series-connected primary switching elements 50. Each primary switching element 50 is in the form of an insulated gate bipolar transistor (IGBT) which is connected in parallel with an anti-parallel diode. It is envisaged that, in other embodiments of the invention, each IGBT may be replaced by a gate turn-off thyristor, a field effect transistor, an injection-enhanced gate transistor, an integrated gate commutated thyristor or any other self-commutated semiconductor device.

It is further envisaged that, in other embodiments of the invention, each plurality of series-connected primary switching elements 50 may be replaced by a single primary switching element 50.

The configuration of the primary limb element portions 38,40 in this manner means that, in use, each primary switching element 50 is switchable to switch the corresponding primary limb element portion 38,40 into and out of circuit between the corresponding DC terminal and the third terminal 42.

The secondary limb element includes first and second secondary limb element portions 52,54 separated by a junction 56. In other words, the first secondary limb element portion 52 is connected between the first DC terminal 32 and the junction 56, and the second secondary limb element portion 54 is connected between the second DC terminal 34 and the junction 56.

Each secondary limb element portion 52,54 includes a DC side chain-link converter 58. Each DC side chain-link converter 58 includes a plurality of series-connected modules 60. Each module 60 includes a pair of secondary switching elements and an energy storage device in the form of a capacitor. The secondary switching elements are connected in parallel with the capacitor in a half-bridge arrangement to define a 2-quadrant unipolar module 60 that can provide zero or positive voltage and can conduct current in two directions.

Each secondary switching element is constituted by a semiconductor device in the form of an Insulated Gate Bipolar Transistor (IGBT) which is connected in parallel with an anti-parallel diode. It is envisaged that, in other embodiments of the invention, each secondary switching element may be a different switching device such as a gate turn-off thyristor, a field effect transistor, an injection-enhanced gate transistor, an integrated gate commutated thyristor or any other self-commutated semiconductor device.

It is envisaged that, in other embodiments of the invention, the capacitor may be replaced by another energy storage device that is capable of storing or releasing energy, e.g. a battery.

The capacitor of each module 60 is selectively bypassed or inserted into the corresponding DC side chain-link converter 58 by changing the state of the secondary switching elements. This selectively directs current through the capacitor or causes current to bypass the capacitor, so that each module 60 provides a zero or positive voltage.

The capacitor of each module 60 is bypassed when the pair of secondary switching elements in each module 60 is configured to form a short circuit in the module 60. This causes current in the DC side chain-link converter 58 to pass through the short circuit and bypass the capacitor, and so the module 60 provides a zero voltage, i.e. the module 60 is configured in a bypassed mode.

The capacitor of each module 60 is inserted into the DC side chain-link converter 58 when the pair of secondary switching elements in each module 60 is configured to allow the current in the DC side chain-link converter 58 to flow into and out of the capacitor. The capacitor then charges or discharges its stored energy so as to provide a positive voltage, i.e. the module 60 is configured in a non-bypassed mode.

It is possible to build up a combined voltage across each DC side chain-link converter 58, which is higher than the voltage available from each of its individual modules 60, via the insertion of the capacitors of multiple modules 60, each providing its own voltage, into each DC side chain-link converter 58. In this manner switching of the secondary switching elements of each module 60 causes each DC side chain-link converter 58 to provide a stepped variable voltage source, which permits the generation of a voltage waveform across each DC side chain-link converter 58 using a step-wise approximation.

The converter limb 36 further includes a connection interconnecting the third terminal 42 and the junction 56 to form a star configuration in which a first branch of the star configuration includes the connection, a second branch of the star configuration includes the first secondary limb element portion 52, a third branch of the star configuration includes the second secondary limb element portion 54 and the junction 56 defines a mid-point of the star configuration. The connection interconnecting the third terminal 42 and the junction 56 allows the DC side chain-link converters 58 to be operated to control the configuration of an AC voltage waveform at the third terminal 42.

The voltage source converter further includes a control unit 62 to control the switching of the director switches in the primary limb element portions 38,40 and the secondary switching elements in each module 60 of each DC side chain-link converter 58.

Operation of the voltage source converter of FIG. 2 is described as follows, with reference to FIG. 3.

In order to transfer power between the AC and DC electrical networks 46,44, the control unit 62 controls the director switches to switch the primary limb portions into and out of circuit between the respective DC terminal and the third terminal 42 to provide a current path between the AC and DC electrical networks 46,44.

During the operation of the voltage source converter, the peak AC voltage of the AC electrical network 46 is slightly lower than the DC voltage of the DC electrical network 44.

For the purposes of describing how the voltage source converter works, it is assumed that the starting point of the operation of the voltage source converter is the point at which the control unit 62 turns on the director switch of the second primary limb element portion 40 and thereby switches the second primary limb element portion 40 into circuit between the second DC terminal 34 and the third terminal 42. It will be appreciated that the starting point of the operation of the voltage source converter can differ depending on the requirements of the power application associated with the voltage source converter.

When the second primary limb element portion 40 is switched into circuit between the second DC terminal 34 and the third terminal 42 (as indicated by 66a in FIG. 3), the director switch in the second primary limb element portion 40 is closed while the director switch in the first primary limb element portion 38 is open. Current is prevented from flowing into the first primary limb element portion 38 as a result of the anti-parallel diodes of the first primary limb element portion 38 being reverse-biased. The switching of the second primary limb element portion 40 into circuit provides a current path that connects the second DC terminal 34 to the third terminal 42 and thereby results in a voltage of $-V_{DC}$ being presented at the third terminal 42.

After a certain period of time, the control unit 62 turns off the director switch of the second primary limb element portion 40. Since the second DC terminal 34 and the third terminal 42 at this stage share the same voltage of $-V_{DC}$, the voltage across the second primary limb element portion 40 is near zero voltage and current. This thereby allows the director switch of the second primary limb element portion 40 to be turned off at near zero voltage and current, thus minimising switching losses. At the same time the control unit 62 controls the switching of the secondary switching elements in each module 60 of the DC side chain-link converters 58 to present a voltage of $+V_{DC}$ at the third terminal 42 which is now disconnected from the second DC terminal 34 as a result of the director switch of the second primary limb element portion 40 being turned off and the anti-parallel diodes of the second primary limb element portion 40 being reverse-biased.

The control unit 62 then controls the switching of the secondary switching elements in each module 60 of the DC side chain-link converters 58 to ramp the voltage at the third terminal 42 in a positive direction (as indicated by 66b in FIG. 3). The anti-parallel diodes of the first and second primary limb element portions 38,40 remain reverse-biased throughout the ramping process, which means that there is zero current flow in the first and second primary limb element portions 38,40.

When the voltage at the third terminal 42 reaches $+V_{DC}$, the control unit 62 turns on the director switch of the first primary limb element portion 38 and thereby switches the first primary limb element portion 38 into circuit between the first DC terminal 32 and the third terminal 42 (as indicated by 66c in FIG. 3). Since the first DC terminal 32 and the third terminal 42 at this stage share the same voltage of $+V_{DC}$, the switching of the director switch of the first primary limb element portion 38 occurs at near zero voltage and current, thus minimising switching losses. Current is prevented from flowing into the second primary limb element portion 40 as a result of the anti-parallel diodes of the second primary limb element portion 40 being reverse-biased. The switching of the first primary limb element portion 38 into circuit provides a current path that connects the first DC terminal 32 to the third terminal 42 and thereby results in a voltage of $+V_{DC}$ being presented at the third terminal 42.

After a certain period of time, the control unit 62 turns off the director switch of the first primary limb element portion 38 and controls the switching of the secondary switching elements in each module 60 of the DC side chain-link converters 58 to present a voltage of $+V_{DC}$ at the third terminal 42 which is now disconnected from the first DC terminal 32 as a result of the director switch of the first primary limb element portion 38 being turned off and the anti-parallel diodes of the first primary limb element portion 38 being reverse-biased. The control unit 62 then controls the switching of the secondary switching elements in each module 60 of the DC side chain-link converters 58 to ramp the voltage at the third terminal 42 in a negative direction until the voltage at the third terminal 42 reaches $-V_{DC}$. Thereafter, the control unit 62 turns on the director switch of the second primary limb element portion 40 to switch the second primary limb element portion 40 back into circuit between the second DC terminal 34 and the third terminal 42 (as indicated by 66a in FIG. 3).

Switching the first and second primary limb element portions 38,40 in and out of circuit allows the voltage at the third terminal 42 to commutate between $+V_{DC}$ and $-V_{DC}$, thereby generating an AC voltage waveform at the third terminal 42.

In this manner the voltage source converter is able to carry out a power transfer function in which the primary limb element portions 38,40 provide a primary current path for the transfer of power between the AC and DC electrical networks 46,44 while the secondary limb element portions, by way of its control of the configuration of the AC voltage waveform at the third terminal 42, supports the switching of each primary limb element portion 38,40 into and out of circuit between the corresponding DC terminal and the third terminal 42.

Figure 4:
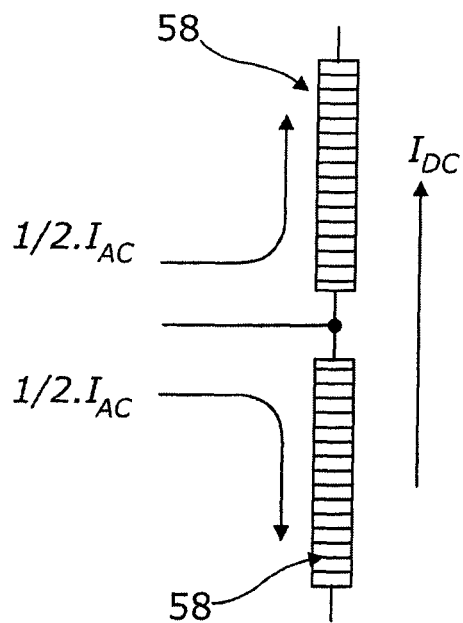
FIG. 4 shows, in schematic form, the combination of AC and DC currents in each DC side chain-link converter during its operation to control the configuration of the AC voltage waveform at the third terminal of the voltage source converter of FIG. 2.

Each capacitor must be rated to account for the variation in voltage level caused by the combination of AC and DC currents in each DC side chain-link converter 58, as shown in FIG. 4, during its operation to control the configuration of the AC voltage waveform at the third terminal 42. In particular, the flow of AC current in the secondary limb element results in near-cancellation of the AC and DC currents in one DC side chain-link converter 58 and summation of the AC and DC currents in the other DC side chain-link converter 58.

A rise in voltage level of each capacitor may also occur as a result of the control of each DC side chain-link converter 58 to balance the voltage levels of its capacitors.

Figure 5:
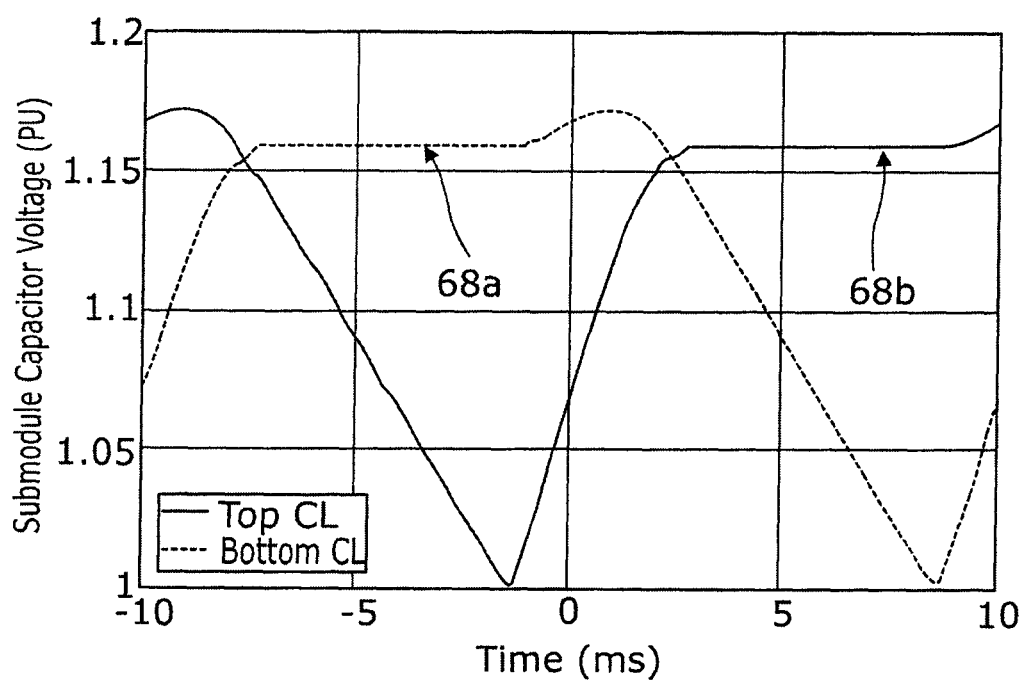
FIG. 5 illustrates, in graph form, the charging and discharging of each capacitor in the DC side chain-link converters of the first and second secondary limb element portions during the operation of the voltage source converter of FIG. 2 as a rectifier.

During the operation of the voltage source converter, the control unit 62 may control the switching of the secondary switching elements in each module 60 of each DC side chain-link converter 58 to correct for any net variation in energy in each DC side chain-link converter 58, an example of which is shown in FIG. 5.

FIG. 5 illustrates, in graph form, the charging and discharging of each capacitor in the DC side chain-link converters 58 of the first and second secondary limb element portions 52,54 during the operation of the first voltage source converter 30 as a rectifier.

Surplus energy is absorbed by the DC side chain-link converter 58 of the first secondary limb element portion 52 in the periods in which both primary limb element portions 38,40 are respectively switched out of circuit between the corresponding DC terminal 32,34 and the third terminal 42. This surplus energy is then discharged into the DC electrical network 44 from the DC side chain-link converter 58 of the first secondary limb element portion 52 in the period in which the first primary limb element portion 38 is not in conduction and the second primary limb element portion 40 is in conduction (as indicated by 68a in FIG. 5). This is because, while the first primary limb element portion 38 is in conduction, there is insufficient voltage across the DC side chain-link converter 58 of the first secondary limb element portion 52 to permit discharge of its surplus energy.

Surplus energy is also absorbed by the DC side chain-link converter 58 of the second secondary limb element portion 54 in the periods in which both primary limb element portions 38,40 are respectively switched out of circuit between the corresponding DC terminal 32,34 and the third terminal 42. This surplus energy is then discharged into the DC electrical network 44 from the DC side chain-link converter 58 of the second secondary limb element portion 54 in the period in which the second primary limb element portion 40 is not in conduction and the first primary limb element portion 38 is in conduction (as indicated by 68b in FIG. 5). This is because, while the second primary limb element portion 40 is in conduction, there is insufficient voltage across the DC side chain-link converter 58 of the second secondary limb element portion 54 to permit discharge of its surplus energy.

When the first voltage source converter 30 is operated as an inverter, the energy level of each DC side chain-link converter 58 falls in the period in which both primary limb element portions 38,40 are respectively switched out of circuit between the corresponding DC terminal 32,34 and the third terminal 42.

To minimise the net variation in energy level charge in the DC side chain-link converter 58 of the first secondary limb element portion 52, the control unit controls the switching of the secondary switching elements in each module 60 of each DC side chain-link converter 58 such that energy from the DC electrical network 44 is injected into the DC side chain-link converter 58 of the first secondary limb element portion 52 in the period in which the first primary limb element portion 38 is not in conduction and the second primary limb element portion 40 is in conduction. This is because, while the first primary limb element portion 38 is in conduction, there is insufficient voltage across the DC side chain-link converter 58 of the first secondary limb element portion 52 to permit injection of energy from the DC electrical network 44.

To minimise the net variation in energy level charge in the DC side chain-link converter 58 of the second secondary limb element portion 54, the control unit controls the switching of the secondary switching elements in each module 60 of each DC side chain-link converter 58 such that energy from the DC electrical network 44 is injected into the DC side chain-link converter 58 of the second secondary limb element portion 54 in the period in which the second primary limb element portion 40 is not in conduction and the first primary limb element portion 38 is in conduction. This is because, while the second primary limb element portion 40 is in conduction, there is insufficient voltage across the DC side chain-link converter 58 of the second secondary limb element portion 54 to permit injection of energy from the DC electrical network 44.

The use of the DC side chain-link converters 58 to control the rate of change of voltage at the third terminal 42 prevents the voltage at the third terminal 42 from ramping too quickly between $+V_{DC}$ and $-V_{DC}$. Using the DC side chain-link converters 58 to control the ramp of the voltage from $+V_{DC}$ and $-V_{DC}$ results in a trapezoidal waveform, as shown in FIG. 3, which prevents the occurrence of fast and high voltage spikes which affect the design and rating of the switching elements.

In addition the rate of change of voltage at the third terminal 42 can be adjusted to modify the characteristics of the overall AC voltage waveform at the third terminal 42 in order to control the fundamental magnitude of the AC voltage waveform and/or filter a harmonic component from the AC voltage waveform.

Figure 6:
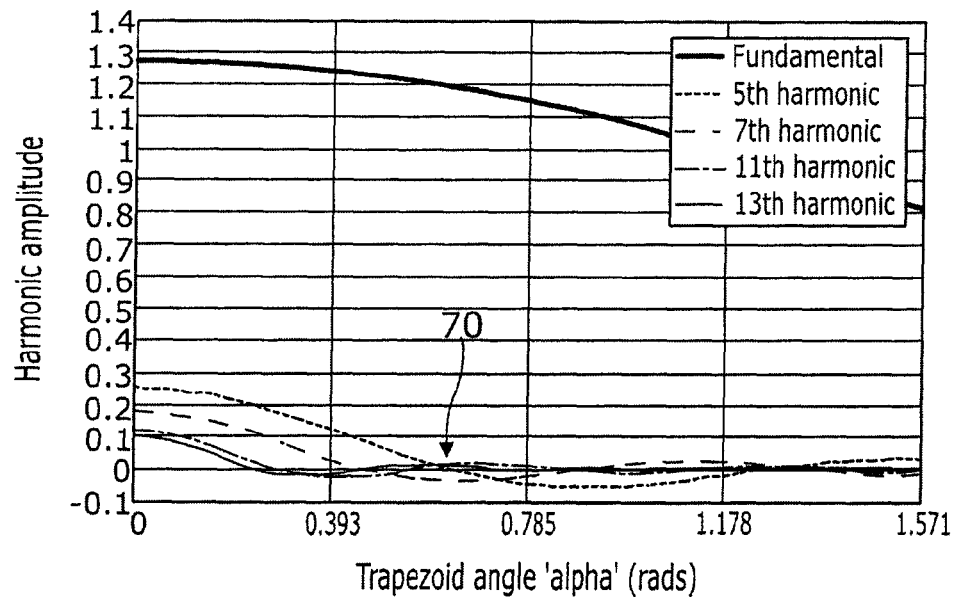
FIG. 6 illustrates, in graph form, a variation in harmonic amplitude of the fundamental and non-triple N harmonic components of the AC voltage waveform for a range of values for an intercept angle $\alpha$.

FIG. 6 illustrates, in graph form, a variation in harmonic amplitude of the fundamental and non-triple N harmonic components of the AC voltage waveform for a range of values for an intercept angle α. For the purposes of the specification, an intercept angle α,−α is defined as a phase angle which corresponds to a common point of intersection between two different voltage slopes of the AC voltage waveform, whereby a voltage slope has a constant rate of change of voltage (which can be negative, zero or positive). As shown in FIG. 3, each common point of intersection is formed at each phase angle α,−α at which each primary limb element portion 38,40 is switched into or out of circuit between the corresponding DC terminal and the third terminal 42.

The control unit 62 may be controlled to modify each intercept angle α,−α by adjusting the length of the period in which each primary limb element portion 38,40 is switched into circuit between the corresponding DC terminal and the third terminal 42.

It can be seen from FIG. 6 that increasing the intercept angle α,−α reduces the fundamental magnitude of the AC voltage waveform.

It can be also seen from FIG. 6 that the intercept angle α,−α can be set to reduce the harmonic amplitude of a harmonic component. For example, the $5^{th}$ harmonic of the AC voltage waveform can be reduced to zero by setting a to be equal to 0.6283 rad (as indicated by 70 in FIG. 6). The reduction in the $5^{th}$ harmonic of the AC voltage waveform is shown in FIG. 7 which illustrates, in graph form, a frequency analysis of the AC phase current at the third terminal 42.

Furthermore the control unit 62, while both primary limb element portions 38,40 are switched out of circuit between the respective DC terminal and the third terminal 42, can control the switching of the secondary switching elements in each module 60 of each DC side chain-link converter 58 to generate a voltage plateau 72a, as shown in FIG. 8. In particular, while both primary limb element portions 38,40 are switched out of circuit between the respective DC terminal and the third terminal 42, the control unit 62 controls the switching of the secondary switching elements in each module 60 of the DC side chain-link converters 58 to first carry out a voltage ramp 72b until the voltage reaches a voltage plateau 72a (which is at zero voltage in this case), maintaining the voltage plateau 72a for a certain period of time and then finally carrying out another voltage ramp 72c. The voltage plateau 72a is configured to be symmetrical about a phase angle n·π of the AC voltage waveform, where n is an integer.

Therefore, a first common point of intersection is formed at each phase angle $α_1,−α_1$ at which each voltage ramp 72b,72c intersects with the voltage plateau 72a, and a second common point of intersection is formed at each phase angle $α_2,−α_2$ at which each primary limb element portion 38,40 is switched into or out of circuit between the corresponding DC terminal and the third terminal 42.

The control unit 62 may be controlled to modify each intercept angle $α_1,−α_1,α_2,−α_2$ by adjusting the length of the period in which each primary limb element portion 38,40 is switched into circuit between the corresponding DC terminal and the third terminal 42 and by adjusting the length of the period in which the voltage plateau 72a is maintained.

FIG. 9 illustrates, in graph form, a variation in fundamental magnitude against the value of $α_1$ for a range of difference values between $α_1$ and $α_2$. The difference value between $α_1$ and $α_2$ ranges between 0.2 rad and 0.8 rad. It can be seen from FIG. 9 that an increase in the difference value between $α_1$ and $α_2$ reduces the peak value of the fundamental magnitude.

FIG. 10 illustrates, in graph form, the THD of the AC voltage waveform against the value of $α_1$ for the same range of difference values between $α_1$ and $α_2$. It can be seen from FIG. 10 that an increase in the difference value between $α_1$ and $α_2$ reduces the THD of the AC voltage waveform but also reduces the achievable fundamental magnitude of the AC voltage waveform.

The addition of the aforementioned voltage plateau 72a to the AC voltage waveform therefore not only provides control over the fundamental magnitude of the AC voltage waveform, but also permits reduction of the THD of the AC voltage waveform.

Figure 1A:
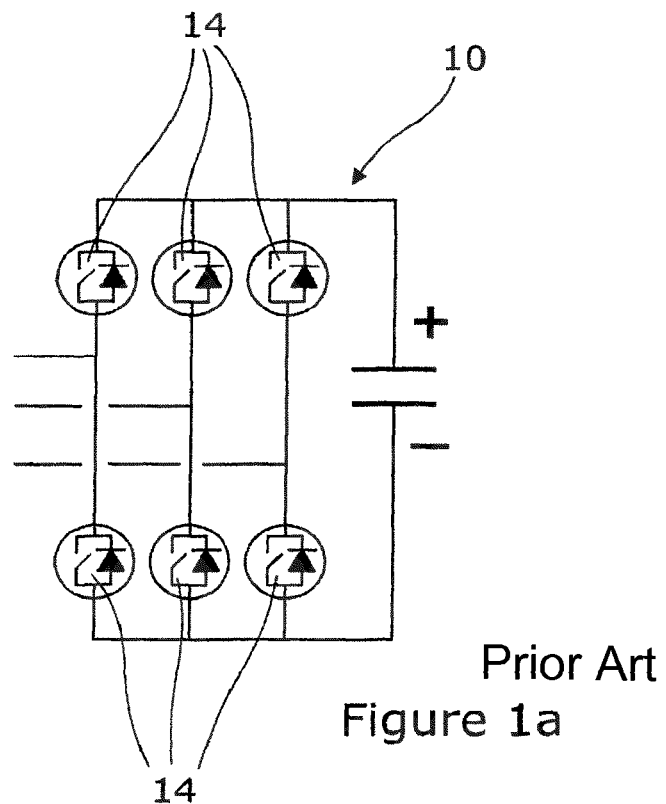
FIGS. 1a, 1b and 1c show, in schematic form, prior art voltage source converters.
Figure 1B:
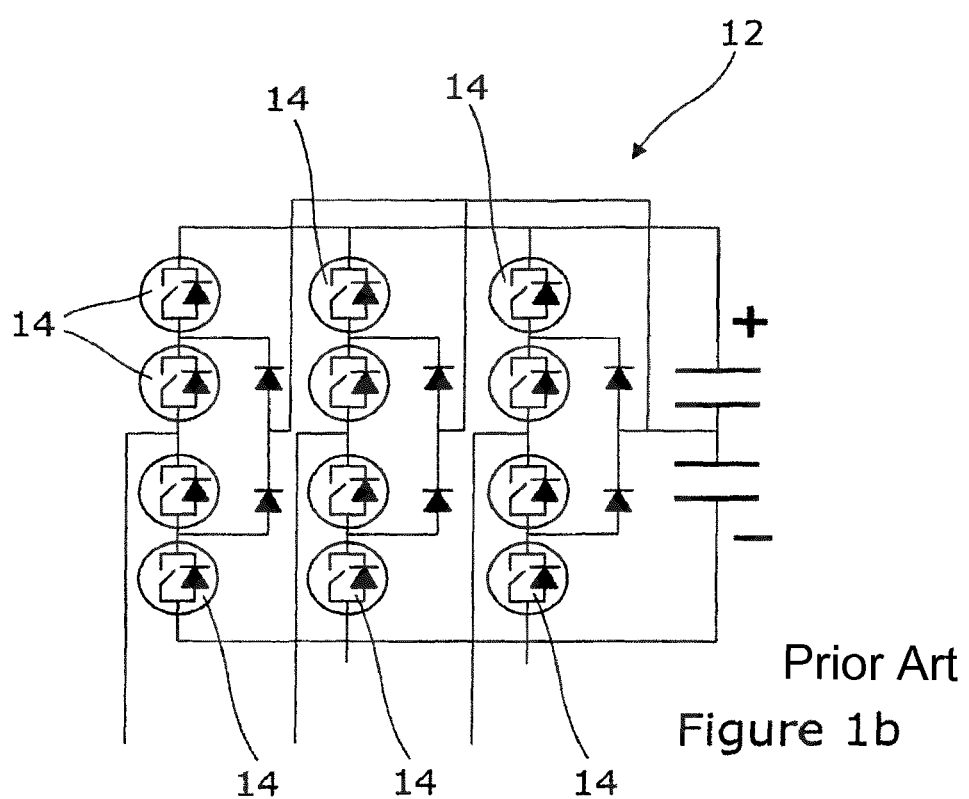

As such the inclusion of the DC side chain-link converters 58 in the voltage source converter provides control over the fundamental magnitude and THD of the AC voltage waveform at the third terminal 42 and permits filtering of a harmonic component from the AC voltage waveform. The configuration of the voltage source converter of FIG. 2 therefore enables transfer of high quality power between the AC and DC electrical networks 46,44 with reduced or zero filtering requirements. In contrast, the omission of each DC side chain-link converter 58 from the first voltage source converter 30 would result in the problems described earlier with reference to the conventional voltage source converters of FIGS. 1a and 1b.

Furthermore the control of the configuration of the AC voltage waveform at the third terminal 42 provides control over the voltage experienced by each director switch in each primary limb element portion 38,40 and thereby reduces the risk of damage caused by voltage levels exceeding the voltage ratings of the director switches. As such it is more straightforward to design and optimise the voltage source converter because the director switches can be chosen without having to consider the possibility of voltage levels exceeding the voltage ratings of the director switches.

The configuration of the voltage source converter of FIG. 2 provides savings in terms of its cost, size and footprint as follows.

Figure 1C:
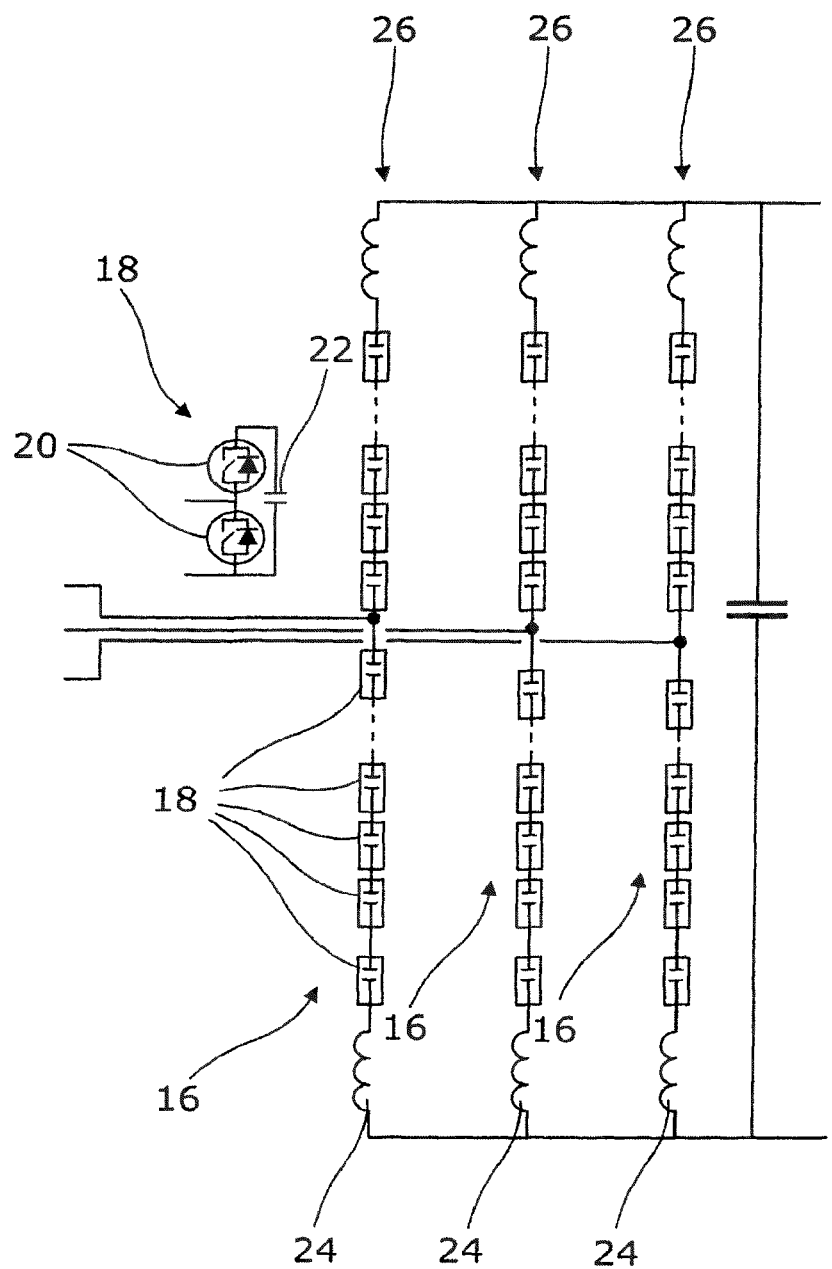

During the operation of the voltage source converter, power is divided between the primary and secondary limb elements over each power cycle. By using primary switching elements 50 with low conduction losses in the primary limb element portions 38,40, the overall conduction losses in the voltage source converter according to the invention can be reduced in comparison to a conventional voltage source converter having the same number of converter limbs, each converter limb including a plurality of modules, an example of which is shown in FIG. 1c. This provides further savings in terms of the cost, size and footprint of the voltage source converter according to the invention.

The DC side chain-link converters 58 of the secondary limb element portions may be controlled to supply DC current to or absorb DC current from the DC electrical network 44 throughout the power cycle and thereby regulate DC ripple, thus limiting or obviating the need for a DC link capacitor which can be large and costly.

When each primary switching element 50 is a naturally commutated switching element (e.g. a thyristor), large snubbing circuitry is normally required to control the rate of change of voltage across each naturally commutated switching element after it has been commutated off. Also, large reactors are required to accommodate the long recovery time between the turn-off and turn-on of the primary switching elements 50. The inclusion of the DC side chain-link converters 58 however permit fine control of the rate of change of voltage across each naturally commutated switching element and the recovery time between the turn-off and turn-on of each naturally commutated switching element, thus reducing or eliminating the need to include the snubbing circuitry and reactors.

The configuration of the voltage source converter of FIG. 2 therefore results in an economical, space-saving voltage source converter with high voltage capabilities.

A second voltage source converter 130 according to a second embodiment of the invention is shown in FIG. 11. The second voltage source converter 130 of FIG. 11 is similar in structure and operation to the first voltage source converter 30 of FIG. 2, and like features share the same reference numerals.

The second voltage source converter 130 differs from the first voltage source converter 30 in that the second voltage source converter 130 further includes an AC side chain-link converter 74. A first end of the AC side chain-link converter 74 is connected to the third terminal 42 of the converter limb 36 of the second voltage source converter 130. In use, a second end of the AC side chain-link converter 74 is connected to the AC electrical network 46 via the phase reactance 48.

Each AC side chain-link converter 74 is similar in structure and operation to each DC side chain-link converter 58.

In use, the control unit 62 controls the switching of the secondary switching elements in each module 60 of the AC side chain-link converter 74 to generate a suitable voltage across the AC side chain-link converter 74 which can be combined with the AC voltage waveform at the third terminal 42 to modify the AC voltage waveform before it is presented to the AC electrical network 46. Such modification of the AC voltage waveform can be performed to filter out one or more harmonic components from the AC voltage waveform.

The AC side chain-link converter 74 therefore provides the voltage source converter with active filtering capability and thereby further reduces or eliminates the requirements for passive filtering at the third terminal 42 of the voltage source converter, thus reducing the real estate requirements of the voltage source converter.

A third voltage source converter 230 according to a third embodiment of the invention is shown in FIG. 12. The third voltage source converter 230 of FIG. 12 is similar in structure and operation to the first voltage source converter 30 of FIG. 2, and like features share the same reference numerals.

The third voltage source converter 230 differs from the first voltage source converter 30 in that, in the third voltage source converter 230:

each primary switching element 50 is in the form of a thyristor instead of an IGBT connected in parallel with an anti-parallel diode;
  turn-off of each director switch is carried out by the control unit 62 controlling the switching of the secondary switching elements in each module 60 of each DC side chain-link converter 58 to control the configuration of the AC voltage waveform of the third terminal 42 to commutate off the director switch;
  each module 60 of each DC side chain-link converter 58 is a 4-quadrant bipolar module 60 instead of a 2-quadrant unipolar module 60.

More specifically each module 60 of each DC side chain-link converter 58 includes two pairs of secondary switching elements and an energy storage device in the form of a capacitor. The secondary switching elements are connected in parallel with the capacitor in a full-bridge arrangement to define a 4-quadrant bipolar module 60 that can provide negative, zero or positive voltage and can conduct current in two directions.

The capacitor of each module 60 is selectively bypassed or inserted into the corresponding DC side chain-link converter 58 by changing the state of the secondary switching elements. This selectively directs current through the capacitor or causes current to bypass the capacitor, so that each module 60 provides a negative, zero or positive voltage.

The capacitor of each module 60 is bypassed when the pairs of secondary switching elements in each module 60 are configured to form a short circuit in the module 60. This causes current in the chain-link converter to pass through the short circuit and bypass the capacitor, and so the module 60 provides a zero voltage, i.e. the module 60 is configured in a bypassed mode.

The capacitor of each module 60 is inserted into the DC side chain-link converter 58 when the pairs of secondary switching elements in each module 60 are configured to allow the current in the DC side chain-link converter 58 to flow into and out of the capacitor. The capacitor then charges or discharges its stored energy so as to provide a non-zero voltage, i.e. the module 60 is configured in a non-bypassed mode. The full-bridge arrangement of the secondary switching elements of each module 60 permits configuration of the secondary switching elements to cause current to flow into and out of the capacitor in either direction, and so each module 60 can be configured to provide a negative or positive voltage in the non-bypassed mode.

In addition to the operation of the third voltage source converter 230 to transfer power between the AC and DC electrical networks 46,44, the third voltage source converter 230 can be operated to provide a small amount of power to the AC electrical network 46 for, for example, energising auxiliary electronics of a wind farm forming part of the AC electrical network 46 at start-up. This is carried out by the control unit 62 controlling the switching of each secondary switching element in each module 60 of each DC side chain-link converter 58 to control the configuration of the AC voltage waveform at the third terminal 42 such that power is transferred from the third voltage source converter 230 to the AC electrical network 46. Meanwhile, during the provision of power from the third voltage source converter 230 to the AC electrical network 46, each director switch is turned off to keep the corresponding primary limb element portion 38,40 switched out of circuit between the corresponding DC terminal 32,42 and the third terminal 42.

Furthermore the third voltage source converter 230 can also be operated in a fault operating mode.

After a fault occurs in the AC or DC electrical network 46,44, a fault current will flow through the third voltage source converter 230. This results in the risk of damage to the voltage source converter components.

The use of thyristors in each director switch not only improves the robustness of the primary limb element portions 38,40, but also makes the primary limb element portions 38,40 capable of withstanding the fault current.

Also, in response to the fault occurring in the AC or DC electrical network 46,44, the control unit 62 controls the switching of the secondary switching elements in each module 60 of each DC side chain-link converter 58 to control the voltage at the third terminal 42 to rapidly commutate off each director switch of the corresponding primary limb element portion 38,40 to limit or prevent the fault current, depending on the time taken to achieve the commutation. Commutation of the director switches causes any remaining fault current to be diverted into the DC side chain-link converters 58. Thereafter, the control unit 62 controls the switching of the secondary switching elements in each module 60 of the DC side chain-link converters 58 so that at least one module 60 provides an opposing voltage to block the remaining fault current.

Thus, the use of the voltage source converter components to limit or prevent the fault current reduces or eliminates the need for the installation of separate fault protection equipment. This leads to savings in terms of hardware size, weight and costs.

FIG. 12 shows the configuration of the third voltage source converter 230 as a rectifier. Optionally each primary switching element 50 may be connected in the opposite direction to enable configuration of the third voltage source converter 230 as an inverter.

Further optionally each primary switching element 50 may be replaced by a pair of primary switching elements 50 connected in anti-parallel to form a bidirectional director switch so that each primary limb element portion 38,40 can conduct current in two directions. This allows the third voltage source converter 230 to be configured to transfer power between the AC and DC electrical networks 46,44 in both directions.

It is envisaged that, in other embodiments of the invention, each thyristor may be replaced by another naturally commutated switching device.

It is further envisaged that, in other embodiments of the invention, the control unit can control the switching of the director switches to form a current bypass path to permit the fault current flowing in the voltage source converter to flow through the current bypass path and thereby bypass the DC side chain-link converters in response to a fault occurring, in use, in the AC or DC electrical network. This prevents the fault current from damaging the anti-parallel diodes of the secondary switching elements in each module of the DC side chain-link converters. The formation of the current bypass path is particularly useful in a voltage source converter in which each module of each DC side chain-link converter is configured in a half-bridge arrangement (e.g. to define a 2-quadrant unipolar module as shown in FIGS. 2 and 11) instead of a full-bridge arrangement (e.g. to define a 4-quadrant bipolar module as shown in FIG. 12), A fourth voltage source converter 330 according to a fourth embodiment of the invention is shown in FIG. 13. The fourth voltage source converter 330 of FIG. 13 is similar in structure and operation to the third voltage source converter 230 of FIG. 12, and like features share the same reference numerals.

The fourth voltage source converter 330 differs from the third voltage source converter 230 in that the fourth voltage source converter 330 further includes an AC side chain-link converter 74, which is similar in structure and operation to each DC side chain-link converter 58 of the third voltage source converter 230. A first end of the AC side chain-link converter 74 is connected to the third terminal 42 of the converter limb 36 of the fourth voltage source converter 330. In use, a second end of the AC side chain-link converter 74 is connected to the AC electrical network 46 via the phase reactance 48.

The AC side chain-link converter 74 of the fourth voltage source converter 330 is operated in a similar manner to the AC side chain-link converter 74 of the second voltage source converter 130 to modify the AC voltage waveform before it is presented to the AC electrical network 46.

A fifth voltage source converter according to a fifth embodiment of the invention is similar in structure and operation to the first voltage source converter 30 of FIG. 2. The fifth voltage source converter differs from the first voltage source converter 30 in that the fifth voltage source converter further includes a plurality of converter limbs, the third terminal of each converter limb being connectable to a respective phase of a three-phase AC electrical network.

The three third terminals of the fifth voltage source converter are connected to the AC electrical network via a star-delta transformer. The star-delta transformer is provided with a tap changer to provide control over the fundamental magnitude of each AC voltage waveform at each third terminal.

The provision of the star-delta transformer to interconnect the fifth voltage source converter and the AC electrical network enables removal of triple N harmonics from each AC voltage waveform before it is presented to the AC electrical network. This thereby reduces the filtering requirements of the fifth voltage source converter.

It is envisaged that, in other embodiments of the invention, the number of converter limbs of the fifth voltage source converter may vary to match the number of phases of a multi-phase AC electrical network to which the fifth voltage source converter is connected.

A sixth voltage source converter according to a sixth embodiment of the invention is similar in structure and operation to the fifth voltage source converter.

The sixth voltage source converter differs from the fifth voltage source converter in that the sixth voltage source converter further includes a plurality of AC side chain-link converters. A first end of each AC side chain-link converter is connected to the third terminal of a respective one of the converter limbs of the sixth voltage source converter. In use, a second end of each AC side chain-link converter is connected to a respective phase of a three-phase AC electrical network.

The AC side chain-link converters of the sixth voltage source converter are similar in structure and operation to the AC side chain-link converter of the second voltage source converter 130.

FIG. 14 illustrates, in graph form, the super harmonic ripples 76a,76b for the AC voltage waveform, including all super harmonics up to the $19^{th}$ harmonic, respectively present at a secondary winding and a primary winding of the transformer if no filtering is carried out by the AC side chain-link converters.

It can be seen from FIG. 14 that the super harmonic ripple 76b at the primary winding exhibits a considerable reduction in peak value in comparison to the super harmonic ripple 76b at the secondary winding due to the removal of triple N harmonics by the star-delta configuration of the transformer. It can therefore be derived from FIG. 14 that the number of modules in each AC side chain-link converter is much lower than the number of modules in each DC side chain-link converter in order for each AC side chain-link converter to be capable of filtering the respective AC voltage waveform to provide a high quality AC voltage waveform at each primary winding of the transformer.

Additionally the control unit can control the switching of the secondary switching elements in each module of each AC side chain-link converter to modify the respective AC voltage waveform to follow a voltage locus consisting of only a fundamental component and at least one selected harmonic component of the respective AC voltage waveform.

FIG. 15 compares, in graph form, the AC voltage waveform 80a at one of the third terminals of the sixth voltage source converter with a "filtered" AC voltage waveform 80b which follows a voltage locus consisting of only fundamental and triple N harmonic components of the AC voltage waveform 80a. Such a voltage locus can be used to define the voltage at each secondary winding of the transformer when controlling the voltage of each AC side chain-link converter of the sixth voltage source converter.

This permits simplification of the control scheme for the AC side chain-link converters because otherwise it would be necessary to perform a complicated harmonic analysis of each AC voltage waveform to separate out the non-triple N harmonic components from each AC voltage waveform.

A seventh voltage source converter according to a seventh embodiment of the invention is similar in structure and operation to the first voltage source converter 30, and like features share the same reference numerals.

The seventh voltage source converter differs from the first voltage source converter 30 in that the seventh voltage source converter comprises a plurality of converter limbs 36. Each of the plurality of converter limbs 36 is identical in structure to the converter limb 36 shown in FIG. 2.

Each converter limb 36 extends between the first and second DC terminals 32,34, and has primary and secondary limb elements connected in parallel between the first and second DC terminals 32,34.

In use, the first and second DC terminals 32,34 are respectively connected to positive and negative terminals of a DC electrical network 44, the positive and negative terminals of the DC electrical network 44 carrying voltages of +Vdc and −Vdc respectively, and the third terminal 42 of each converter limb 36 is connected to a respective phase of a multi-phase AC electrical network 46 via a phase reactance 48 and a star-delta transformer (not shown). The delta section of the star-delta transformer defines a transformer secondary that is connected to the voltage source converter, while the star section of the star-delta transformer defines a transformer primary that is connected to the AC electrical network 46.

The provision of the star-delta transformer to interconnect the seventh voltage source converter and the AC electrical network 46 enables removal of triple N harmonics from each AC voltage waveform before it is presented to the AC electrical network 46. This thereby reduces the filtering requirements of the seventh voltage source converter.

It is envisaged that, in other embodiments of the invention, the seventh voltage source converter may have a single converter limb or a different plurality of converter limbs to match the number of phases of an AC electrical network to which the seventh voltage source converter is connected.

The first primary and secondary limb element portions 38,52 define a first limb portion. The second primary and secondary limb element portions 40,54 define a second limb portion.

A further operation of the seventh voltage source converter is described as follows, with reference to FIGS. 3 and 16 to 21.

For the purposes of this specification, the operation of the seventh voltage source converter is primarily described with reference to one of its plurality of converter limbs 36. It will be appreciated that the described operation of one of the plurality of converter limbs 36 of the seventh voltage source converter applies mutatis mutandis to the operation of each of the other converter limbs 36.

In order to transfer power between the AC and DC electrical networks 46,44, the control unit 62 controls the director switches to switch the primary limb element portions 38,40 into and out of circuit between the respective DC terminal 32,34 and the third terminal 42 to provide a current path between the AC and DC electrical networks 46,44.

For the purposes of describing how the seventh voltage source converter works, it is assumed that the starting point of the operation of the seventh voltage source converter is the point at which the control unit 62 turns on the director switch of the second primary limb element portion 40 and thereby switches the second primary limb element portion 40 into circuit between the second DC terminal 34 and the third terminal 42. It will be appreciated that the starting point of the operation of the seventh voltage source converter can differ depending on the requirements of the power application associated with the seventh voltage source converter.

When the second primary limb element portion 40 is switched into circuit between the second DC terminal 34 and the third terminal 42 (as indicated by 66a in FIG. 3 and section 1 in FIG. 16), the director switch in the second primary limb element portion 40 is closed while the director switch in the first primary limb element portion 38 is open (as indicated by section 1 in FIG. 17). Current is prevented from flowing into the first primary limb element portion 38 as a result of the anti-parallel diodes of the first primary limb element portion 38 being reverse-biased. The switching of the second primary limb element portion 40 into circuit provides a current path that connects the second DC terminal 34 to the third terminal 42 and thereby results in a voltage of $-V_{DC}$ being presented at the third terminal 42.

When the second primary limb element portion 40 is switched into circuit between the second DC terminal 34 and the third terminal 42 (as indicated by 66a in FIG. 3 and section 1 in FIG. 16), the control unit 62 selectively controls switching of the secondary switching elements in each module 60 of the DC side chain-link converter 58 of the first limb portion so as to form a current source that injects a filtering current into the DC side of the seventh voltage source converter, as shown in FIG. 17. The filtering current is shaped to permit minimisation or cancellation of one or more harmonic components in the DC voltage presented to the DC electrical network 44, thus reducing DC voltage ripple in the DC voltage. As such injection of the filtering current enables active DC side filtering of the DC voltage presented to the DC electrical network 44 during transfer of power between the AC and DC electrical networks 46,44 via the current path provided by the second primary limb element portion 40.

At the same time the control unit 62 controls switching of the secondary switching elements in each module 60 of the DC side chain-link converter 58 of the second limb portion to configure that DC side chain-link converter 58 as a current source with a current reference of zero, as shown in FIG. 17.

Configuring the DC side chain-link converter 58 of the second limb portion as a current source inhibits current from passing through that DC side chain-link converter 58 when the second primary limb element portion 40 is switched into circuit between the second DC terminal 34 and the third terminal 42, thus inhibiting that DC side chain-link converter 58 from affecting the AC voltage waveform at the third terminal 42.

Further configuring the DC side chain-link converter 58 of the second limb portion as a current source with a current reference of zero enables that DC side chain-link converter 58 to be readily operated to drive a current into the director switch of the second limb portion when the second primary limb element portion 40 is initially switched into circuit between the second DC terminal 34 and the third terminal 42.

After a certain period of time, the control unit 62 turns off the director switch of the second primary limb element portion 40. Since the second DC terminal 34 and the third terminal 42 at this stage share the same voltage of $-V_{DC}$, the voltage across the second primary limb element portion 40 is near zero voltage and current. This thereby allows the director switch of the second primary limb element portion 40 to be turned off at near zero voltage and current, thus minimising switching losses. At the same time the control unit 62 controls the switching of the secondary switching elements in each module 60 of the DC side chain-link converters 58 to present a voltage of +V$_{DC}$ at the third terminal 42 which is now disconnected from the second DC terminal 34 as a result of the director switch of the second primary limb element portion 40 being turned off and the anti-parallel diodes of the second primary limb element portion 40 being reverse-biased.

The control unit 62 then controls the switching of the secondary switching elements in each module 60 of the DC side chain-link converters 58 to ramp the voltage at the third terminal 42 in a positive direction (as indicated by 66b in FIG. 3 and sections 2 and 3 in FIG. 16). The anti-parallel diodes of the first and second primary limb element portions 38,40 remain reverse-biased throughout the ramping process, which means that there is zero current flow in the first and second primary limb element portions 38,40.

During the ramping of the voltage at the third terminal 42 in a positive direction, the initial part of the voltage at the third terminal 42 is controlled by the DC side chain-link converter 58 of the second limb portion, and the remaining part of the voltage at the third terminal 42 is controlled by the DC side chain-link converter 58 of the first limb portion. This is carried out by the control unit 62 controlling switching of the secondary switching elements in each module 60 of each DC side chain-link converter 58 to form a first arrangement of the DC side chain-link converters 58 during the initial part of the voltage at the third terminal 42 (as indicated by section 2 in FIGS. 16 and 17), and, after zero crossing of the AC voltage 67 of the AC electrical network 46, to change to a second arrangement of the DC side chain-link converters 58 during the remaining part of the voltage at the third terminal 42 (as indicated by section 3 in FIGS. 16 and 17). The first arrangement includes the DC side chain-link converter 58 of the first limb portion being configured as a current source with a current reference of zero and the DC side chain-link converter 58 of the second limb portion being configured as a voltage source. The second arrangement includes the DC side chain-link converter 58 of the first limb portion being configured as a voltage source and the DC side chain-link converter 58 of the second limb portion being configured as a current source with a current reference of zero.

When the voltage at the third terminal 42 reaches +V$_{DC}$, the control unit 62 turns on the director switch of the first primary limb element portion 38 and thereby switches the first primary limb element portion 38 into circuit between the first DC terminal 32 and the third terminal 42 (as indicated by 66c in FIG. 3 and section 4 in FIG. 16). Since the first DC terminal 32 and the third terminal 42 at this stage share the same voltage of +V$_{DC}$, the switching of the director switch of the first primary limb element portion 38 occurs at near zero voltage and current, thus minimising switching losses. Current is prevented from flowing into the second primary limb element portion 40 as a result of the anti-parallel diodes of the second primary limb element portion 40 being reverse-biased. The switching of the first primary limb element portion 38 into circuit provides a current path that connects the first DC terminal 32 to the third terminal 42 and thereby results in a voltage of +V$_{DC}$ being presented at the third terminal 42.

When the first primary limb element portion 38 is switched into circuit between the first DC terminal 32 and the third terminal 42 (as indicated by 66c in FIG. 3 and section 4 in FIG. 16), the control unit 62 selectively controls switching of the secondary switching elements in each module 60 of the DC side chain-link converter 58 of the second limb portion so as to form a current source that injects a filtering current into the DC side of the seventh voltage source converter, as shown in FIG. 17. The filtering current is shaped to permit minimisation or cancellation of one or more harmonic components in the DC voltage presented to the DC electrical network 44, thus reducing DC voltage ripple in the DC voltage. As such injection of the filtering current enables active DC side filtering of the DC voltage presented to the DC electrical network 44 during transfer of power between the AC and DC electrical networks 46,44 via the current path provided by the first primary limb element portion 38.

At the same time the control unit 62 controls switching of the secondary switching elements in each module 60 of the DC side chain-link converter 58 of the first limb portion to configure that DC side chain-link converter 58 as a current source with a current reference of zero, as shown in FIG. 17.

Configuring the DC side chain-link converter 58 of the first limb portion as a current source inhibits current from passing through that DC side chain-link converter 58 when the first primary limb element portion 38 is switched into circuit between the first DC terminal 32 and the third terminal 42, thus inhibiting that DC side chain-link converter 58 from affecting the AC voltage waveform at the third terminal 42.

Further configuring the DC side chain-link converter 58 of the first limb portion as a current source with a current reference of zero enables that DC side chain-link converter 58 to be readily operated to drive a current into the director switch of the first limb portion when the first primary limb element portion 38 is initially switched into circuit between the first DC terminal 32 and the third terminal 42.

After a certain period of time, the control unit 62 turns off the director switch of the first primary limb element portion 38 and controls the switching of the secondary switching elements in each module 60 of the DC side chain-link converters 58 to present a voltage of +V$_{DC}$ at the third terminal 42 which is now disconnected from the first DC terminal 32 as a result of the director switch of the first primary limb element portion 38 being turned off and the anti-parallel diodes of the first primary limb element portion 38 being reverse-biased.

The control unit 62 then controls the switching of the secondary switching elements in each module 60 of the DC side chain-link converters 58 to ramp the voltage at the third terminal 42 in a negative direction (as indicated by sections 5 and 6 in FIGS. 16 and 17), until the voltage at the third terminal 42 reaches −V$_{DC}$.

During the ramping of the voltage at the third terminal 42 in a negative direction, the initial part of the voltage at the third terminal 42 is controlled by the DC side chain-link converter 58 of the first limb portion, and the remaining part of the voltage at the third terminal 42 is controlled by the DC side chain-link converter 58 of the second limb portion. This is carried out by the control unit 62 controlling switching of the secondary switching elements in each module 60 of each DC side chain-link converter 58 to form the second arrangement of the DC side chain-link converters 58 during the initial part of the voltage at the third terminal 42 (as indicated by section 5 in FIGS. 16 and 17), and, after zero crossing of the AC voltage 67 of the AC electrical network 46, to change to the first arrangement of the DC side chain-link converters 58 during the remaining part of the voltage at the third terminal 42 (as indicated by section 5 in FIGS. 16 and 17).

Thereafter, the control unit 62 turns on the director switch of the second primary limb element portion 40 to switch the second primary limb element portion 40 back into circuit between the second DC terminal 34 and the third terminal 42 (as indicated by 66a in FIG. 3 and section 1 in FIG. 16).

Switching the first and second primary limb element portions 38,40 in and out of circuit allows the voltage at the third terminal 42 to commutate between $+V_{DC}$ and $-V_{DC}$, thereby generating an AC voltage waveform at the third terminal 42.

During the operation of the seventh voltage source converter to transfer three-phase power, the primary limb elements of two of the plurality of converter limbs 36 are in conduction at any one time. Thus, the control unit 62 may be configured to control switching of the secondary switching elements in each module 60 of each DC side chain-link converter 58 configured to inject the respective filtering current so as circulate the filtering currents through the two converter limbs 36 with a conducting primary limb element as equal and opposite currents that are set to cancel one or more harmonic components in the DC voltage presented to the DC electrical network 44.

FIG. 18 illustrates, in graph form, a direct current ripple 200 generated by the seventh voltage source converter in the absence of a filtering current to cancel harmonic components in the direct current ripple 200. It should be noted that the notches in the direct current ripple 200 are due to the changes in control of the DC side chain-link converters 58. As seen in FIG. 19, the notches are absent from the AC voltages and currents in the transformer secondary of the connected star-delta transformer during generation of the direct current ripple 200 of FIG. 18.

FIG. 20 illustrates, in graph form, a direct current ripple 202 generated by the seventh voltage source converter when a filtering current is injected to cancel $6^{th}$ and $12^{th}$ harmonic components in the direct current ripple 202. It can be seen from FIG. 20 that injection of the filtering current to cancel the $6^{th}$ and $12^{th}$ harmonic components from the direct current ripple 202 results in a reduced DC current ripple in comparison to the direct current ripple 200 shown in FIG. 18, thus demonstrating a reduction in DC voltage ripple in the DC voltage presented to the DC electrical network 44.

FIG. 21 illustrates the theoretically ideal direct current ripple 204 achievable under idealised operating conditions when a filtering current is injected to cancel $6^{th}$ and $12^{th}$ harmonic components in the direct current ripple 204. It can be seen from FIGS. 20 and 21 that the shapes of the direct current ripples 202,204 are practically identical, thus demonstrating the capability of the seventh voltage source converter to reduce DC voltage ripple in the DC voltage presented to the DC electrical network 44, through injection of the filtering current, to close to a theoretically ideal extent.

Injection of the filtering current by at least one DC side chain-link converter 58 of the seventh voltage source converter according to the invention therefore permits minimisation or cancellation of one or more harmonic components in the DC voltage presented to the DC electrical network, thus reducing DC voltage ripple in the DC voltage. This in turn reduces the required size of the associated DC link capacitor or other filtering hardware (or eliminates the need for the associated DC link capacitor or other filtering hardware), thus reducing the overall size, weight and cost of the seventh voltage source converter. More particularly, injecting the filtering current at a suitable phase and amplitude could enable reduction of the size of the associated DC link capacitor or other filtering hardware by a factor of up to several times (or eliminate the need for the associated DC link capacitor or other filtering hardware).

In addition, each of the DC side chain-link converters 58 is capable of providing a stepped variable voltage source, which permits the generation of a voltage waveform across each chain-link converter 58 using a step-wise approximation and thereby enables formation of the filtering current required to minimise or cancel one or more harmonic components in the DC voltage presented to the DC electrical network 44. It will be appreciated that the filtering current may be shaped to permit minimisation or cancellation of any harmonic component in the DC voltage presented to the DC electrical network 44.

Furthermore the use of the DC side chain-link converters 58 to both control the configuration of the AC voltage waveform at the respective third terminal 42 and inject the filtering current results in a cost-efficient and energy-efficient seventh voltage source converter in comparison to a combination of a conventional voltage source converter and a DC link capacitor or other filtering hardware.

The configuration of the seventh voltage source converter therefore results in an economical, space-saving voltage source converter with excellent DC filtering capabilities.

Optionally the control unit 62 may be configured to detect a presence of at least one harmonic component in the DC voltage presented to the DC electrical network 44 and to selectively control switching of the secondary switching elements in each module 60 of at least one of the DC side chain-link converters 58 to inject the filtering current into the DC side of the seventh voltage source converter so as to minimise or cancel the or each detected harmonic component in the DC voltage presented to the DC electrical network 44. This results in a responsive seventh voltage source converter that is capable of generating a suitable filtering current even when one or more unexpected harmonic components are present in the DC voltage presented to the DC electrical network 44.

To detect a presence of at least one harmonic component in the DC voltage presented to the DC electrical network 44, the control unit 62 may include a feedback controller configured to monitor DC voltage ripple in the DC voltage presented to the DC electrical network 44 and/or include at least one band-pass filter tuned to a specific harmonic frequency.

Further optionally the seventh voltage source converter may further include a plurality of AC side chain-links converters. A first end of an AC side chain-link converter is connected to the third terminal 42 of one of the plurality of converter limbs 36 of the seventh voltage source converter, and, in use, a second end of the AC side chain-link converter is connected to the AC electrical network 46 via the phase reactance 48 and the star-delta transformer (not shown).

Each AC side chain-link converter is similar in structure and operation to each DC side chain-link converter 58.

In use, the control unit 62 controls the switching of the secondary switching elements in each module of each AC side chain-link converter to generate a suitable voltage across each AC side chain-link converter which can be combined with the AC voltage waveform at the respective third terminal 42 to modify the AC voltage waveform before it is presented to the AC electrical network 46. Such modification of the AC voltage waveform can be performed to filter out one or more harmonic components (e.g. non-triple N harmonic components) from the AC voltage waveform.

The AC side chain-link converters therefore provides the seventh voltage source converter with active filtering capability at its AC side, and thereby further reduces or eliminates the requirements for passive filtering at the third terminals 42 of the seventh voltage source converter, thus reducing the real estate requirements of the seventh voltage source converter.

An eighth voltage source converter according to an eighth embodiment of the invention is similar in structure and operation to the seventh voltage source converter, and like features share the same reference numerals.

The eighth voltage source converter differs from the seventh voltage source converter in that, in the eighth voltage source converter:
- each primary switching element 50 is in the form of a thyristor instead of an IGBT connected in parallel with an anti-parallel diode;
- turn-off of each director switch is carried out by the control unit 62 controlling the switching of the secondary switching elements in each module 60 of each DC side chain-link converter 58 to control the configuration of the AC voltage waveform of the second terminal 42 to commutate off the director switch;
- each module 60 of each DC side chain-link converter 58 is a 4-quadrant bipolar module 60 instead of a 2-quadrant unipolar module 60.

More specifically each module 60 of each DC side chain-link converter 58 includes two pairs of secondary switching elements and an energy storage device in the form of a capacitor. The secondary switching elements are connected in parallel with the capacitor in a full-bridge arrangement to define a 4-quadrant bipolar module 60 that can provide negative, zero or positive voltage and can conduct current in two directions.

It will be appreciated that the configuration of each module 60 of each DC side chain-link converter 58 as a 4-quadrant bipolar module 60 is merely chosen to help illustrate the operation of the eighth voltage source converter, and the configuration of each DC side chain-link converter 58 may vary. For example, in other embodiments of the invention, each DC side chain-link converter may include a combination of a plurality of 2-quadrant unipolar modules and one or more 4-quadrant bipolar modules.

The capacitor of each module 60 is selectively bypassed or inserted into the corresponding DC side chain-link converter 58 by changing the state of the secondary switching elements. This selectively directs current through the capacitor or causes current to bypass the capacitor, so that each module 60 provides a negative, zero or positive voltage.

The capacitor of each module 60 is bypassed when the pairs of secondary switching elements in each module 60 are configured to form a short circuit in the module 60. This causes current in the chain-link converter to pass through the short circuit and bypass the capacitor, and so the module 60 provides a zero voltage, i.e. the module 60 is configured in a bypassed mode.

The capacitor of each module 60 is inserted into the DC side chain-link converter 58 when the pairs of secondary switching elements in each module 60 are configured to allow the current in the DC side chain-link converter 58 to flow into and out of the capacitor. The capacitor then charges or discharges its stored energy so as to provide a non-zero voltage, i.e. the module 60 is configured in a non-bypassed mode. The full-bridge arrangement of the secondary switching elements of each module 60 permits configuration of the secondary switching elements to cause current to flow into and out of the capacitor in either direction, and so each module 60 can be configured to provide a negative or positive voltage in the non-bypassed mode.

It will be appreciated that configuring a DC side chain-link converter 58 of the first or second limb portion as a current source with a current reference of zero enables that DC side chain-link converter 58 to be readily operated to not only drive a current into the director switch of the same limb portion when the primary limb element portion 38,40 of the same limb portion is initially switched into circuit between the respective DC terminal 32,34 and the third terminal 42, but also to provide commutation of the primary switching elements 50 of the same limb portion when the primary limb element portion 38,40 of the same limb portion is to be switched out of circuit between the respective DC terminal 32,34 and the third terminal 42.

Each primary switching element 50 may be connected in a particular direction to enable configuration of the eighth voltage source converter as an inverter or rectifier.

Optionally each primary switching element 50 may be replaced by a pair of primary switching elements 50 connected in anti-parallel to form a bidirectional director switch so that each primary limb element portion 38,40 can conduct current in two directions. This allows the eighth voltage source converter to be configured to transfer power between the AC and DC electrical networks 46,44 in both directions.

It is envisaged that, in other embodiments of the invention, each thyristor may be replaced by another naturally commutated switching device.

A ninth voltage source converter according to a ninth embodiment of the invention is similar in structure and operation to the first voltage source converter 30, and like features share the same reference numerals.

The ninth voltage source converter differs from the first voltage source converter 30 in that the control unit 162 of the ninth voltage source converter is further configured to control the switching of the secondary switching elements in each module 60 of the DC side chain-link converters 58 to generate an AC voltage waveform at the third terminal 42, the AC voltage waveform including an AC voltage waveform portion between positive and negative peak values of the AC voltage waveform, whereby the AC voltage waveform portion includes at least two different voltage profiles to filter one or more harmonic components from the AC voltage waveform, and at least one of the different voltage profiles is defined by a non-zero voltage slope. The control unit 162 of the ninth voltage source converter is shown in FIG. 22.

During generation and control of the configuration of the AC voltage waveform at the third terminal 42, the shape of the AC voltage waveform is defined as follows.

Figure 23:
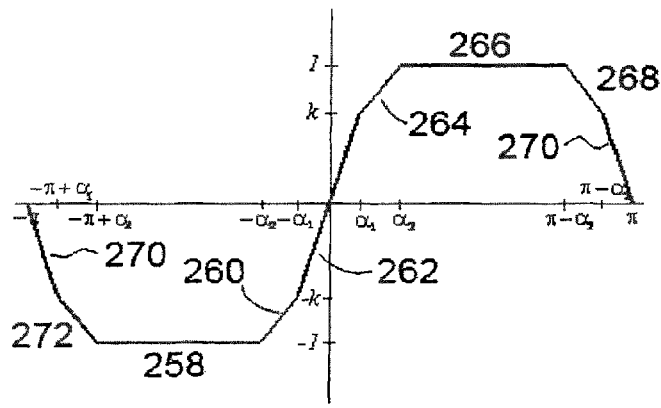

The configuration of the AC voltage waveform at the third terminal 42 is controlled such that the AC voltage waveform is symmetrical about the phase angles $-\pi/2$ and $\pi/2$ and is asymmetrical about zero phase angle and that an AC voltage waveform portion including different voltage profiles, with at least one of the different voltage profiles being defined by a non-zero voltage slope, (e.g. first and second non-zero voltage slopes as shown in FIG. 23) is generated between the positive and negative peak values of the AC voltage waveform at the third terminal 42.

As shown in FIG. 23, the AC voltage waveform includes:
- a first section 258 with a negative voltage at the third terminal 42 (i.e. the negative peak value of the AC voltage waveform) and with a zero voltage slope;
- a second section 260 with the first non-zero voltage slope;
- a third section 262 with the second non-zero voltage slope, the third section 262 extending through zero phase angle;
- a fourth section 264 with the first non-zero voltage slope; and
- a fifth section 266 with a positive voltage at the third terminal 42 (i.e. the positive peak value of the AC voltage waveform) and with a zero voltage slope;

sixth, seventh and eighth sections 268,270,272 which are shaped as the inverse of the second, third and fourth sections 260,262,264 respectively.

The sequence of generation of the different sections 258,260,262,264,266,268,270,272 of the AC voltage waveform is described as follows:

the first section 258 is followed by the second section 260. The common point of intersection between the first and second sections 258,260, i.e. a first intercept angle, corresponds to a phase angle of −α2;

the second section 260 is followed by the third section 262. The common point of intersection between the second and third sections 260,262, i.e. a second intercept angle, corresponds to a phase angle of −α1;

the third section 262 is followed by the fourth section 264. The common point of intersection between the third and fourth sections 262,264, i.e. a third intercept angle, corresponds to a phase angle of α1;

the fourth section 264 is followed by the fifth section 266. The common point of intersection between the fourth and fifth sections 264,266, i.e. a fourth intercept angle, corresponds to a phase angle of α2;

the fifth section 266 is followed by the sixth, seventh and eighth sections 268,270,272 in sequential order.

As such the AC voltage waveform includes a first non-zero voltage slope, a second non-zero voltage slope and a zero voltage slope over each of the periods −π to −π/2, −π/2 to 0, 0 to π/2 and π/2 to π.

The above sequence of generation repeats itself for as long as the ninth voltage source converter is operated to transfer power between the AC and DC electrical networks 46,44.

The amplitude value of the AC voltage waveform that corresponds to the second intercept angle −α1 is equal to −k while the amplitude value of the AC voltage waveform that corresponds to the third intercept angle α1 is equal to k, whereby k is a value falling between zero and the magnitude of the first and fifth sections 258,266 of the AC voltage waveform.

In this manner the control unit 162 controls the switching of the secondary switching elements in each module 60 of the DC side chain-link converters 58 to generate an AC voltage waveform at the third terminal 42, the AC voltage waveform including an AC voltage waveform portion between the positive and negative peak values of the AC voltage waveform, the AC voltage waveform portion including the first and second voltage slopes (namely the second, third and fourth sections 260,262,264 of the AC voltage waveform).

The configuration of the AC voltage waveform in this manner defines the number of degrees of freedom, i.e. α1, α2 and k, over the period 0 to π/2 of the AC voltage waveform. These degrees of freedom of the AC voltage waveform enable the control unit 162 to control the switching of the secondary switching elements in each module 60 of the DC side chain-link converters 58 to generate an AC voltage waveform in a manner that permits filtering of one or more harmonic components from the AC voltage waveform, as follows.

The Fourier expressions for the AC voltage waveform can be expressed using the three terms $\alpha_1$, $\alpha_2$ and k as defined above to give the magnitude for the '$r^{th}$' harmonic, $b_r$, as: −

$$b_r = \frac{4}{\pi} \cdot \frac{1}{(\alpha_2 - \alpha_1) \cdot r^2} \cdot \left[\left(1 - \frac{\alpha_2}{\alpha_1} \cdot k\right) \cdot \sin(r \cdot \alpha_1) - (1 - k) \cdot \sin(r \cdot \alpha_2)\right]$$

Figure 24:
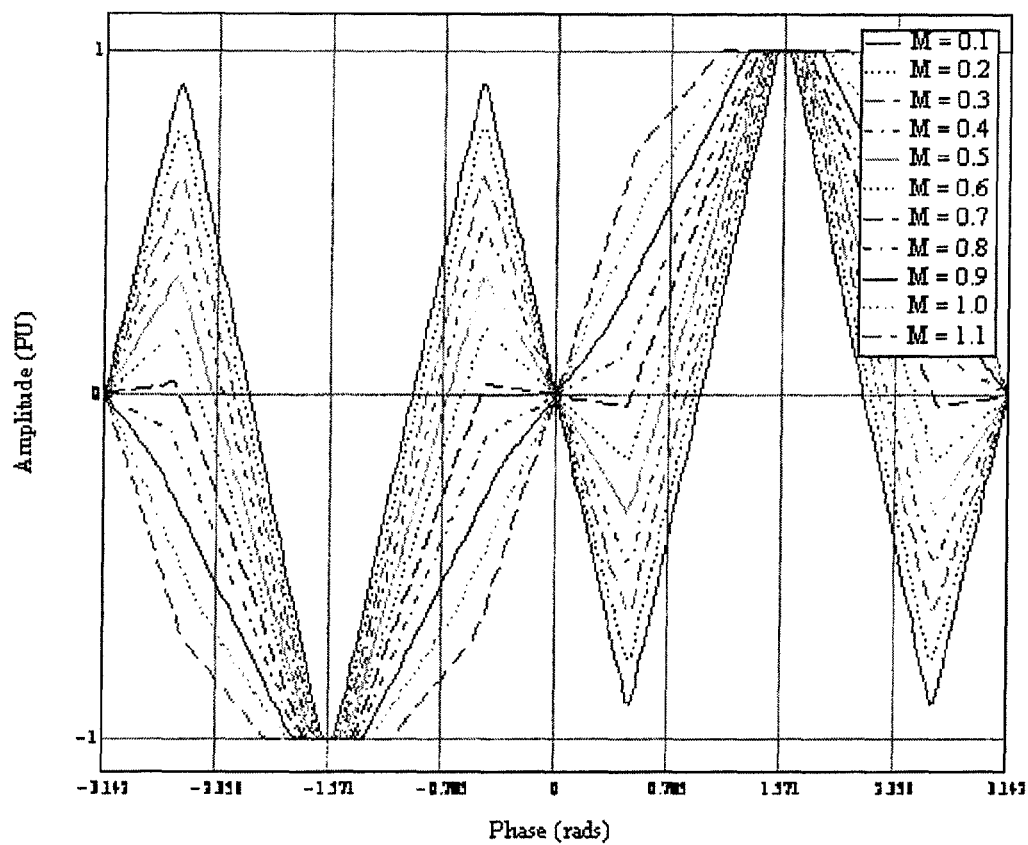

A set of three simultaneous equations are then formed, in which the fundamental magnitude for the AC voltage waveform is equated to a magnitude value M, and the magnitudes for the $5^{th}$ and $7^{th}$ harmonics are equated to zero as given below. These are then solved for the values of $\alpha_1$, $\alpha_2$ and k for a range of values of M, as illustrated in FIG. 24 which shows the different waveforms for different values of fundamental magnitude for the AC voltage waveform.

$$\frac{4}{\pi} \cdot \frac{1}{(\alpha_2 - \alpha_1)} \cdot \left[\left(1 - \frac{\alpha_2}{\alpha_1} \cdot k\right) \cdot \sin(\alpha_1) - (1 - k) \cdot \sin(\alpha_2)\right] = M$$

$$\frac{4}{\pi} \cdot \frac{1}{(\alpha_2 - \alpha_1) \cdot 25} \cdot \left[\left(1 - \frac{\alpha_2}{\alpha_1} \cdot k\right) \cdot \sin(5 \cdot \alpha_1) - (1 - k) \cdot \sin(5 \cdot \alpha_2)\right] = 0$$

$$\frac{4}{\pi} \cdot \frac{1}{(\alpha_2 - \alpha_1) \cdot 49} \cdot \left[\left(1 - \frac{\alpha_2}{\alpha_1} \cdot k\right) \cdot \sin(7 \cdot \alpha_1) - (1 - k) \cdot \sin(7 \cdot \alpha_2)\right] = 0$$

FIG. 25 illustrates, in graph form, the values of α1, α2 and k plotted against different values of fundamental magnitude for the AC voltage waveform. It can be seen from FIG. 25 that there is a discontinuity in the region of 0.931 which can be accounted for by using hysteresis. Other than the aforementioned discontinuity, the variation in the values of α1, α2 and k are generally linear and can therefore be determined using interpolation.

The control unit 162, as shown in FIG. 22, obtains a value for the required fundamental magnitude and phase offset of the AC voltage waveform using a vector control. The fundamental magnitude of the AC voltage waveform is then scaled using a form factor. FIG. 26 illustrates the scaling of the AC voltage waveform using a range of form factors with reference to a fundamental magnitude of 1.0 per unit.

The scaled fundamental magnitude is then passed to a look-up table (LUT) derived from the above equations to obtain the required values of $\alpha_1$, $\alpha_2$ and k, all of which are then passed to a state machine to obtain the time varying value of voltage required to be generated by the DC side chain-link converters 58. Finally the time varying value of voltage is multiplied by the inverse of the form factor so that the net effect on the fundamental magnitude of the AC voltage waveform is neutral.

The control unit 162 then controls the switching of the secondary switching elements in each module 60 of the DC side chain-link converters 58 in accordance with the time varying value of voltage multiplied by the inverse of the form factor. As such the control unit 162 is able to control the switching of the secondary switching elements in each module 60 of the DC side chain-link converters 58 to generate the AC voltage waveform at the third terminal 42, the AC voltage waveform including the AC voltage waveform portion with the first and second voltage slopes.

The generation of the AC voltage waveform at the third terminal 42, the AC voltage waveform including an AC voltage waveform portion with the first and second voltage slopes, causes the $5^{th}$ and $7^{th}$ harmonics to be filtered out of the AC voltage waveform generated at the third terminal 42.

The filtering of the $5^{th}$ and $7^{th}$ harmonics from the AC voltage waveform may be carried out using different values for α1, α2 and k, examples of which are described as follows.

In one example, the control unit 162 may control the switching of the secondary switching elements in each module 60 of the DC side chain-link converters 58 to generate an AC voltage waveform at the third terminal 42 so as to filter the $5^{th}$ and $7^{th}$ harmonics from the AC voltage waveform by forcing the value of k to zero. Such switching is carried out on the basis of the following set of simultaneous equations (which are derived from the abovementioned Fourier expressions):

$$\frac{4}{\pi} \cdot \frac{1}{(\alpha_2 - \alpha_1) \cdot 25} \cdot [\sin(5 \cdot \alpha_1) - \sin(5 \cdot \alpha_2)] = 0$$

$$\frac{4}{\pi} \cdot \frac{1}{(\alpha_2 - \alpha_1) \cdot 49} \cdot [\sin(7 \cdot \alpha_1) - \sin(7 \cdot \alpha_2)] = 0$$

The solution to the above simultaneous equations is: $\alpha_1 = 0.045$ rads, $\alpha_2 = 1.302$ rads, and $k=0$. FIG. 27a illustrates, in graph form, third, fourth and fifth sections 300,302,304 of the resultant AC voltage waveform whereby the third section 300 has a first voltage profile that is defined by a zero voltage slope, and the fourth section 302 has a second voltage profile that is defined by a positive voltage slope.

In another example, the control unit 162 may control the switching of the secondary switching elements in each module 60 of the DC side chain-link converters 58 to generate an AC voltage waveform at the third terminal 42 so as to filter the $5^{th}$ and $7^{th}$ harmonics from the AC voltage waveform by forcing the value of $\alpha_1$ to zero. Such switching is carried out on the basis of the following set of simultaneous equations (which are derived from the abovementioned Fourier expressions):

$$\frac{4}{\pi} \cdot \frac{1}{(\alpha_2 - \alpha_1) \cdot 25} \cdot \left[\left(1 - \frac{\alpha_2}{\alpha_1} \cdot k\right) \cdot \sin(5 \cdot \alpha_1) - (1-k) \cdot \sin(5 \cdot \alpha_2)\right] = 0$$

$$\frac{4}{\pi} \cdot \frac{1}{(\alpha_2 - \alpha_1) \cdot 49} \cdot \left[\left(1 - \frac{\alpha_2}{\alpha_1} \cdot k\right) \cdot \sin(7 \cdot \alpha_1) - (1-k) \cdot \sin(7 \cdot \alpha_2)\right] = 0$$

$$\alpha_1 = 0$$

The solution to the above simultaneous equations is: $\alpha_1 = 0.000$ rads, $\alpha_2 = 0.756$ rads, and $k=0.136$ Volts per unit. FIG. 27b illustrates, in graph form, third, fourth and fifth sections 306,308,310 of the resultant AC voltage waveform whereby the third section 306 has a first voltage profile that is defined by an instantaneous change in voltage, and the fourth section 308 has a second voltage profile that is defined by a positive voltage slope.

It can be seen from FIGS. 27a and 27b that using an AC voltage waveform that results from the value of $\alpha_1$ being forced to zero gives rise to a conduction time for each primary limb element portion 38,40 that is longer than a conduction time for each primary limb element portion 38,40 when using an AC voltage waveform that results from the value of k being forced to zero.

The ninth voltage source converter is therefore capable of varying the harmonic content of the AC voltage waveform without affecting its fundamental voltage waveform. Such capability of the ninth voltage source converter enables the ninth voltage source converter to transfer high quality power between the AC and DC electrical networks 46,44.

In the embodiment shown, the $5^{th}$ and $7^{th}$ harmonics were selected to illustrate the filtering of harmonic components from the AC voltage waveform. Nevertheless it will be appreciated that the ninth voltage source converter can also be operated to filter out other harmonics from the AC voltage waveform.

For example, the control unit 162 may control the switching of the secondary switching elements in each module 60 of the DC side chain-link converters 58 to generate an AC voltage waveform at the third terminal 42 so as to filter the $5^{th}$, $7^{th}$ and $11^{th}$ harmonics from the AC voltage waveform. Such switching is carried out on the basis of the following set of simultaneous equation (which are derived from the abovementioned Fourier expressions):

$$\frac{4}{\pi} \cdot \frac{1}{(\alpha_2 - \alpha_1) \cdot 25} \cdot \left[\left(1 - \frac{\alpha_2}{\alpha_1} \cdot k\right) \cdot \sin(5 \cdot \alpha_1) - (1-k) \cdot \sin(5 \cdot \alpha_2)\right] = 0$$

$$\frac{4}{\pi} \cdot \frac{1}{(\alpha_2 - \alpha_1) \cdot 49} \cdot \left[\left(1 - \frac{\alpha_2}{\alpha_1} \cdot k\right) \cdot \sin(7 \cdot \alpha_1) - (1-k) \cdot \sin(7 \cdot \alpha_2)\right] = 0$$

$$\frac{4}{\pi} \cdot \frac{1}{(\alpha_2 - \alpha_1) \cdot 121} \cdot \left[\left(1 - \frac{\alpha_2}{\alpha_1} \cdot k\right) \cdot \sin(11 \cdot \alpha_1) - (1-k) \cdot \sin(11 \cdot \alpha_2)\right] = 0$$

The solution to the above simultaneous equations is: $\alpha_1 = 0.340$ rads, $\alpha_2 = 0.814$ rads, and $k=0.565$ Volts per unit. FIG. 27c illustrates, in graph form, third, fourth and fifth sections 312,314,316 of the resultant AC voltage waveform whereby the third and fourth sections 312,314 respectively have different voltage profiles that are defined by different, positive voltage slopes.

It will also be appreciated that the number of voltage profiles in the AC voltage waveform portion may be varied to further increase the number of degrees of freedom of the AC voltage waveform (i.e. the intercept angles of the AC voltage waveform, and each amplitude value of the AC voltage waveform that corresponds to the respective intercept angle), and thereby allow an increased number of harmonic components to be filtered out from the AC voltage waveform.

The invention claimed is:

1. A voltage source converter comprising a converter limb, the converter limb extending between first and second DC terminals and having primary and secondary limb elements connected in parallel between the first and second DC terminals, each DC terminal being connectable to a DC electrical network, the primary limb element including first and second primary limb element portions separated by a third terminal, the third terminal being connectable to an AC electrical network, each primary limb element portion including at least one primary switching element, each primary switching element being switchable to switch the corresponding primary limb element portion into and out of circuit between a respective one of the DC terminals and the third terminal, the secondary limb element including first and second secondary limb element portions separated by a junction, each secondary limb element portion including a DC side chain-link converter, each chain-link converter including a plurality of series-connected modules, each module of each chain-link converter including at least one secondary switching element and at least one energy storage device, the or each secondary switching element and the or each energy storage device in each module combining to selectively provide a voltage source, the converter limb further including a connection interconnecting the third terminal and the junction to form a star configuration in which a first branch of the star configuration includes the connection, a second branch of the star configuration includes the first secondary limb element portion, a third branch of the star configuration includes the second secondary limb element portion, and the junction defines a mid-point of the star configuration, wherein the connection directly interconnects the third terminal and the junction without any intermediate switching element connected between the third terminal and the junction, wherein the voltage source converter further includes a control unit which controls the switching of each primary switching element to switch the corresponding primary limb element portion into and out of circuit between the corresponding DC terminal and the third terminal to selectively transfer power between the AC and DC electrical networks via each of the primary limb element portions, the control unit further controlling the switching of the or each secondary switching element in each module of each DC side chain-link converter to control the configuration of an AC voltage waveform at the third terminal.

2. The voltage source converter according to claim 1 wherein the control unit, prior to one of the primary limb element portions being switched into or out of circuit between the corresponding DC terminal and the third terminal, controls the switching of the or each secondary switching element in each module of each DC side chain-link converter to control the configuration of the AC voltage waveform at the third terminal to minimise a voltage across that primary limb element portion.

3. The voltage source converter according to claim 1 wherein the control unit controls the switching of the or each secondary switching element in each module of each DC side chain-link converter to discharge surplus energy from the DC side chain-link converter of the first secondary limb element portion or inject energy from the DC electrical network into the DC side chain-link converter of the first secondary limb element portion while the first primary limb element portion is not in conduction and the second primary limb element portion is in conduction and to discharge surplus energy from the DC side chain-link converter of the second secondary limb element portion or inject energy from the DC electrical network into the DC side chain-link converter of the second secondary limb element portion while the second primary limb element portion is not in conduction and the first primary limb element portion is in conduction.

4. The voltage source converter according to claim 1 wherein each primary switching element is a self-commutated or naturally commutated switching element.

5. The voltage source converter according to claim 1 wherein the control unit controls the switching of the or each secondary switching element in each module of each DC side chain-link converter to control the configuration of the AC voltage waveform at the third terminal to selectively transfer power from the voltage source converter to the AC electrical network.

6. The voltage source converter according to claim 1 wherein, when each primary switching element is a naturally commutated switching element, the control unit controls the switching of the or each secondary switching element in each module of each DC side chain-link converter to control the configuration of the AC voltage waveform at the third terminal to selectively commutate each primary switching element in response to a fault occurring, in use, in the AC or DC electrical network.

7. The voltage source converter according to claim 1 wherein the control unit controls the switching of the or each primary switching element to form a current bypass path to permit a current flowing in the voltage source converter to flow through the current bypass path and thereby bypass each DC side chain-link converter in response to a fault occurring, in use, in the AC or DC electrical network.

8. The voltage source converter according to claim 1 wherein each primary limb element portion includes at least one pair of primary switching elements connected in anti-parallel so that each primary limb element portion can conduct current in two directions.

9. The voltage source converter according to claim 1 wherein the control unit is configured to control the switching of the or each secondary switching element in each module of at least one of the DC side chain-link converters to generate an AC voltage waveform at the third terminal, the AC voltage waveform including an AC voltage waveform portion between positive and negative peak values of the AC voltage waveform, the AC voltage waveform portion including at least two different voltage profiles to filter one or more harmonic components from the AC voltage waveform, at least one of the different voltage profiles being defined by a non-zero voltage slope.

10. The voltage source converter according to claim 9 wherein at least two of the different voltage profiles are defined by different voltage slopes.

11. The voltage source converter according to claim 9 wherein at least one of the different voltage profiles is defined by an instantaneous change in voltage.

12. The voltage source converter according to claim 9 wherein the control unit is configured to control the switching of the or each secondary switching element in each module of at least one of the DC side chain-link converters to control the configuration of the AC voltage waveform portion at the third terminal when both primary limb element portions are switched out of circuit between the respective DC terminal and the third terminal.

13. The voltage source converter according to claim 9 wherein the control unit is configured to control the switching of the or each secondary switching element in each module of at least one of the DC side chain-link converters to modify the value of each intercept angle of the AC voltage waveform and thereby filter out one or more harmonic components from the AC voltage waveform, each intercept angle defining a phase angle corresponding to a common point of intersection between two different voltage profiles of the AC voltage waveform.

14. The voltage source converter according to claim 9 wherein the control unit is configured to control the switching of the or each secondary switching element in each module of at least one of the DC side chain-link converters to modify the magnitude of the AC voltage waveform corresponding to each intercept angle of the AC voltage waveform and thereby filter out one or more harmonic components from the AC voltage waveform, each intercept angle defining a phase angle corresponding to a common point of intersection between two different voltage profiles of the AC voltage waveform.

15. The voltage source converter according to claim 1 wherein the control unit, while both primary limb element portions are switched out of circuit between the respective DC terminal and the third terminal, controls the switching of the or each secondary switching element in each module of each DC side chain-link converter to control the rate of change of voltage at the third terminal.

16. The voltage source converter according to claim 15 wherein the control unit controls the switching of the or each secondary switching element in each module of the DC side chain-link converter to modify the value of each intercept angle of the AC voltage waveform to control the fundamental magnitude of the AC voltage waveform.

17. The voltage source converter according to claim 15 wherein the control unit controls the switching of the or each secondary switching element in each module of the DC side chain-link converter to modify the value of each intercept angle of the AC voltage waveform to filter a harmonic component from the AC voltage waveform.

18. The voltage source converter according to claim 15 wherein the control unit, while both primary limb element portions are switched out of circuit between the respective DC terminal and the third terminal, controls the switching of the or each secondary switching element in each module of each DC side chain-link converter to generate a voltage plateau which is symmetrical about a phase angle $n \cdot (\pi + \phi)$ of the AC voltage waveform at the third terminal, where n is an integer and $\phi$ is a phase shift between a first vector representing an AC voltage of the AC electrical network and a second vector representing the AC voltage waveform at the third terminal.

19. The voltage source converter according to claim 15 wherein the control unit is configured to control switching of the or each secondary switching element in each module of each DC side chain-link converter to change between:
   (a) a first arrangement in which a first of the DC side chain-link converters is configured as a voltage source and a second of the DC side chain-link converters is configured as a current source; and
   (b) a second arrangement in which the second of the DC side chain-link converters is configured as a voltage source and the first of the DC side chain-link converters is configured as a current source,
   when both primary limb element portions are switched out of circuit between the respective DC terminal and the third terminal.

20. The voltage source converter according to claim 15 wherein the control unit is configured to control switching of the or each secondary switching element in each module of each DC side chain-link converter to configure one of the DC side chain-link converters as a voltage source and the other of the DC side chain-link converters as a current source when both primary limb element portions are switched out of circuit between the respective DC terminal and the third terminal.

21. The voltage source converter according to claim 20 wherein the DC side chain-link converter configured as a current source when both primary limb element portions are switched out of circuit between the respective DC terminal and the third terminal is configured as a current source with a current reference of zero.

22. The voltage source converter according to claim 1 wherein the control unit is further configured to selectively control switching of the or each secondary switching element in each module of at least one of the DC side chain-link converters so as to inject a filtering current into the DC side of the voltage source converter and thereby minimise or cancel one or more harmonic components in a DC voltage presented to the DC electrical network.

23. The voltage source converter according to claim 22 wherein the control unit is configured to detect a presence of at least one harmonic component in the DC voltage presented to the DC electrical network and to selectively control switching of the or each secondary switching element in each module of at least one of the DC side chain-link converters to inject the filtering current into the DC side of the voltage source converter so as to minimise or cancel the or each detected harmonic component in the DC voltage presented to the DC electrical network.

24. The voltage source converter according to claim 22 wherein the first primary and secondary limb element portions define a first limb portion, the second primary and secondary limb element portions define a second limb portion, and the control unit is configured to selectively control switching of the or each secondary switching element in each module of the DC side chain-link converter of one of the first and second limb portions so as to inject the filtering current into the DC side of the voltage source converter when the or each primary switching element of the other of the first and second limb portions is switched to switch the corresponding primary limb element portion into circuit between the respective DC terminal and the third terminal.

25. The voltage source converter according to claim 24 wherein the control unit is configured to control switching of the or each secondary switching element in each module of the DC side chain-link converter of the other of the first and second limb portions to configure that DC side chain-link converter as a current source.

26. The voltage source converter according to claim 25 wherein the control unit is configured to control switching of the or each secondary switching element in each module of the DC side chain-link converter of the other of the first and second limb portions to configure that DC side chain-link converter as a current source with a current reference of zero.

27. The voltage source converter according to claim 1 including a plurality of converter limbs, the third terminal of each converter limb being connectable to a respective phase of a multi-phase AC electrical network.

28. The voltage source converter according to Claim 27 wherein the control unit is configured to control switching of the or each secondary switching element in each module of at least one of the DC side chain-link converters to circulate the filtering current through at least two of the plurality of converter limbs.

29. The voltage source converter according to claim 1 further including an AC side chain-link converter, a first end of the AC side chain-link converter being connected to the third terminal and a second end of the AC side chain-link converter being connectable to the AC electrical network, the control unit controlling the switching of the or each secondary switching element in each module of the AC side chain-link converter to modify the AC voltage waveform for presentation to the AC electrical network.

30. The voltage source converter according to claim 29 wherein the control unit controls the switching of the or each secondary switching element in each module of the AC side chain-link converter to modify the AC voltage waveform to follow a voltage locus consisting of only a fundamental component and at least one selected harmonic component of the AC voltage waveform.

* * * * *